United States Patent
Tan et al.

(10) Patent No.: US 9,516,315 B2
(45) Date of Patent: Dec. 6, 2016

(54) PERCEPTUALLY LOSSLESS AND PERCEPTUALLY ENHANCED IMAGE COMPRESSION SYSTEM AND METHOD

(71) Applicant: HD2 TECHNOLOGIES PTY. LTD., Vermont South, Victoria (AU)

(72) Inventors: Damian Marcellinus Tan, Mitcham (AU); David Wu, Vermont South (AU)

(73) Assignee: HD2 TECHNOLOGIES PTY. LTD., Vermont South, Victoria (AU)

( * ) Notice: Subject to any disclaimer, the term of this patent is extended or adjusted under 35 U.S.C. 154(b) by 56 days.

(21) Appl. No.: 14/355,406

(22) PCT Filed: Oct. 29, 2012

(86) PCT No.: PCT/AU2012/001319
§ 371 (c)(1),
(2) Date: Apr. 30, 2014

(87) PCT Pub. No.: WO2013/063638
PCT Pub. Date: May 10, 2013

(65) Prior Publication Data
US 2015/0043815 A1    Feb. 12, 2015

Related U.S. Application Data

(60) Provisional application No. 61/553,207, filed on Oct. 30, 2011.

(51) Int. Cl.
*G06T 7/40* (2006.01)
*H04N 19/86* (2014.01)
(Continued)

(52) U.S. Cl.
CPC ......... *H04N 19/00909* (2013.01); *G06T 7/408* (2013.01); *H04N 19/124* (2014.11);
(Continued)

(58) Field of Classification Search
None
See application file for complete search history.

(56) References Cited

U.S. PATENT DOCUMENTS

| | | | |
|---|---|---|---|
| 5,629,780 A * | 5/1997 | Watson | H04N 19/176 358/539 |
| 6,125,201 A | 9/2000 | Zador | |
| 6,154,493 A | 11/2000 | Acharya et al. | |

FOREIGN PATENT DOCUMENTS

| | | |
|---|---|---|
| WO | 99/60793 A1 | 11/1999 |
| WO | 2008/030434 A2 | 3/2008 |

OTHER PUBLICATIONS

Eckert, Michael P., and Andrew P. Bradley. "Perceptual quality metrics applied to still image compression." Signal processing 70.3 (1998): 177-200.*

(Continued)

*Primary Examiner* — Bhavesh Mehta
*Assistant Examiner* — Menatoallah Youssef
(74) *Attorney, Agent, or Firm* — Flener IP Law, LLC; Zareefa B. Flener

(57) ABSTRACT

An apparatus is provided for generating perceptually lossless image data or perceptually enhanced image data including: a color transform unit for color transforming a received image to a desired color space, forming converted colorspace (CCS) images; a transform unit for receiving CCS images and transforming the CCS images into transformed CCS images each containing a set of transform coefficients; a quantization unit to quantize the transformed CCS images to form quantized CCS images; an image processor for receiving and processing transformed or quantized CCS images to produce optimized CCS images that are perceptually lossless or perceptually enhanced in quality; and an encoder for compressing the optimized CCS images; wherein the compressed optimized CCS images are subsequently prepared for storage and/or transmission.

9 Claims, 15 Drawing Sheets

(51) Int. Cl.

| | |
|---|---|
| *H04N 19/90* | (2014.01) |
| *H04N 19/00* | (2014.01) |
| *H04N 19/147* | (2014.01) |
| *H04N 19/46* | (2014.01) |
| *H04N 19/63* | (2014.01) |
| *H04N 19/124* | (2014.01) |
| *H04N 19/154* | (2014.01) |
| *H04N 19/18* | (2014.01) |
| *H04N 19/625* | (2014.01) |

(52) U.S. Cl.
CPC .......... *H04N19/147* (2014.11); *H04N 19/154* (2014.11); *H04N 19/18* (2014.11); *H04N 19/46* (2014.11); *H04N 19/625* (2014.11); *H04N 19/63* (2014.11); *H04N 19/86* (2014.11); *H04N 19/90* (2014.11)

(56) References Cited

OTHER PUBLICATIONS

Wu, David, et al. "Perceptually lossless medical image coding." Medical Imaging, IEEE Transactions on 25.3 (2006): 335-344.*
Written Opinion of the International Search Authority mailed Nov. 19, 2012, corresponding to PCT/AU2012/001319.
D. M. Tan and H. R. Wu, Perceptual Lossless Coding of Digital Monochrom Images, Proceedings of IEEE International Symposium on Intelligent Signal Processing and Communication Systems, 2003.
D. M. Tan and H.R. Wu, Adaptation of Visually Lossless Colour Coding to JPEG2000 in the Composit Colour Space, Proceedings if IEEE Pacific Rim Conference on Multimedia, pp. IB 2.4.1-7, 2003.
D.M. Tan and H.R. Wu, Perceptually Lossless Medical Image Coding, IEEE Transactions on Medical Imaging, vol. 25, No. 3, pp. 335-344, Mar. 2003.
D.M. Tan and R. Wu Perceptual Lossless Coding of Digital Monochrome Images, Proceedings of IEEE International Symposium on Intelligent Signal Processing and Communication Systems, 2003.
D. M. Tan and H. R. Wu, Adaptation of Visually Lossless Colour Coding to JPEG2000 in the Composite Colour Space, Proceedings of IEEE Pacific Rim Conference on Multimedia, pp. IB 2.4.1-7, 2003.
D. Wu et al., Perceptually Lossless Medical Image Coding, IEEE Transactions on Medical Imaging, vol. 25, No. 3, pp. 335-344, Mar. 2006.
Wu, D., Tan, D.M., and Wu, H.R., Perceptual Coding at the Threshold Level for the Digital Cinema System Specification, p. 796-801, ICME 2010, 978-1-4244-7493-6/10, 2010 IEEE.
Watson, A. B. (1993). DCTune: A technique for visual optimization of DCT quantization matrices for individual images. Society for Information Display Digest of Technical Papers XXIV, 946-949.

* cited by examiner

PERCEPTUALLY LOSSLESS AND PERCEPTUALLY ENHANCED IMAGE COMPRESSION SYSTEM AND METHOD

FIELD OF THE INVENTION

This invention relates to a perceptually lossless and perceptually enhanced image compression system and method.

TERMS AND DEFINITIONS

CCS is converted color-space. An example is the component color space with luminance (Y) and chrominace-blue ($C_b$) and chrominance-red ($C_r$) channels.
chroma is short for chrominance. When referenced by itself, chroma is indicative of both chroma-blue ($C_b$) and chroma-red channels ($C_r$).
DCT is discrete cosine transform
DWT is discrete wavelet transform
HVS is human visual system
JND is just-noticeable difference
JNND is just-not-noticeable difference
luma is short for luminance
optimized image represents the perceptually lossless image in perceptually lossless mode. In perceptually enhanced mode, it represents the perceptually enhanced image. The optimized image is in the transform-domain.
pixel-domain images include raw RGB (red-blue-green) image, Y image, $C_b$ image and $C_r$ image.
transform-domain images include the transformed CCS (luma/chroma) image, the quantized CCS (luma/chroma) image and the optimized CCS (luma/chroma) image.
The terms pictures and images are used interchangeably and have the same meaning.
The terms reference image, original image and received image are used interchangeably and have the same meaning.
Perceptually lossless coding means compressing pictures to the JNND threshold level such that any original picture is visually indistinct to its decompressed JNND version. The decompressed JNND version of an original image comes from decoding the JNND encoded image. The JNND encoded image is the original image encoded to the JNND threshold level.
Perceptually enhanced coding means compressing pictures in a manner such that when these enhanced-encoded pictures are decoded, they have a higher visual quality level (e.g. sharper, clearer, etc) when compared with their original versions. Enhanced-encoded pictures mean pictures that have been encoded to a perceptually enhanced level.

BACKGROUND OF THE INVENTION

Any discussion of documents, devices, acts or knowledge in this specification is included to explain the context of the invention. It should not be taken as an admission that any of the material forms a part of the prior art base or the common general knowledge in the relevant art on or before the priority date of the disclosure and broad consistory statements herein.

Compressing digital picture data for storage and transmission has attracted considerable research over many years. Rapid advances in digital technology has seen an explosive growth in digital image and video content, which is stored, transmitted between locations and shared and used in various internetwork applications, such as social networking and on picture albums. Such growth is expected to continue with many digital applications that have not yet been realised. Many digital applications today are limited by transmission bandwidth and storage space capacity. Although it may be a relatively easy task of increasing transmission bandwidth and storage capacity, the cost and effort required would be uneconomical, especially in the case for transmission bandwidth and given that the resolution and volume of digital image and video content is ever increasing.

Digital images, including still images and moving images, comprise a rapidly growing segment of digital information which is stored and communicated in day to day activities, research, science, government and commercial industries. There are numerous applications for the storage and transmission of digital information, including satellite imaging, medical imaging, tele-health applications, video-on-demand, digital still and video cameras, imaging applications in cloud computing, interactive multimedia applications, video games, advanced security systems and digital television (DTV) systems such as high-definition TV (HDTV) supported by DTV broadcasting.

As resolution of digital imaging equipment increases, the number of digital bits required to represent detailed digital images increases proportionally. This has placed a considerable strain on communication networks and storage devices needed to transport and store these images. As a result, considerable research efforts have been invested into compression of digital images. The ultimate goal of compression is to reduce the number of bits required to be stored and/or transmitted, thereby providing more efficient utilization of bandwidth and storage capacity.

Image compression can fall into two categories, being lossless (reversible) and lossy (irreversible). Lossless compression preserves all information, but is limited generally to a compression ratio gain of between 50% (2:1) to 75% (4:1). In contrast, lossy compression removes a portion of information in images in exchange for increased compression ratio gains leading to degradations in image quality. Therefore, lossy picture compression is seen as a balancing act between rate (compression ratios) versus distortion (picture degradation). That is, what is the distortion level for a given compression rate, or conversely, what is the best possible rate for a given quality (distortion) level. This relationship is functionalized in the rate-distortion (R-D) curve.

Conventional lossy compression methods rely on statistical measures and some primitive heuristics to identify and remove information in images that are considered less important, unimportant or insignificant. However, these approaches are unable to accurately and, consistently identify and preserve visually important information, thereby leading to fluctuations in visible distortions and inconsistent levels of picture quality. Effective solutions to this problem have focussed on incorporating functionalities of the human visual system (HVS) to picture coding systems to provide some control over perceived picture quality relative to compression ratios. This class of picture coders are generally referred to as perceptual image (and video) coders. Even with HVS modelling, visible distortions are inevitable when high compression ratios become a practical necessity due to limitations in transmission bandwidth and/or storage capacity. However, in situations where there are no transmission or storage limitations, then it is highly undesirable to have compressed images which exhibit no visible distortions at all. This is especially true for critical applications such as medical imaging for example. Perceptually lossless image coding is the solution for flawless compression of images.

Both perceptual image coding and perceptually lossless image coding is not truly possible without sufficient understanding of the psychophysical aspects of HVS and the necessary tools to model them. In essence, a HVS model is a core component of any perceptually lossless image coder. Past attempts at perceptual image coding have focussed on experimental/heuristic approach. For example, simple threshold operations, where pixels below certain magnitude range can be removed. More recent HVS models have focussed on low level functional aspects of the human eye and brain and works predominantly towards the JND (Just-Noticeable-Difference) level, i.e., the point at which distortions are just visible. There are three issues to consider when it comes to HVS models for perceptual image coding and perceptually lossless image coding: accuracy; complexity and applicability/adaptability.

Accuracy is dependent of the level of HVS modelling involved. Simple HVS models trade accuracy for simplicity. That is, they are less accurate, but also less complex. Complexity relates not only to computation and implementation, but also the optimization process of the model which is dependent on the number of model parameters. Advanced HVS models have parameters which must be calibrated in order for these models to operate properly. These parameters are optimized based on experimental data obtained through extensive and tedious visual experiments. Applicability is an integration issue of where and how a HVS model can be used. For example, how does one adapt a particular HVS model into existing image encoders? In some cases, HVS models must be adapted to both the encoder and the decoder in order function. Having to make extensive modifications to the encoder, the decoder or both increases complexity, incurs additional cost and time to manufacturers and users of compression technology. Ideally, HVS models should be seamlessly integrated into an encoding system as exemplified by Watson's DCTune, which adaptively selects quantization levels for the JPEG (Joint Photographic Experts Group) coder to match image content for a predetermined level of picture quality.

Existing technologies in the market for HVS based compression have focussed on the JND level, the point at which distortions are just visible. Therefore, current image coding technologies in the market do not have the capability to provide an optimal compression rate with perceptually lossless quality. The issue of image compression at the just-not-noticeable-difference (JNND), i.e., the point where distortions and just imperceptible, was addressed partially in the following articles:

1. D. M. Tan and H. R. Wu. "Perceptual Lossless Coding of Digital Monochrome Images", in Proceedings of IEEE International Symposium on Intelligent Signal Processing and Communication Systems, 2003;
2. D. M. Tan and H. R. Wu. "Adaptation of Visually Lossless Colour Coding to JPEG2000 in the Composite Colour Space", in Proceedings of IEEE Pacific Rim Conference on Multimedia, pp. 1B2.4.1-7, 2003; and
3. D. Wu et al, "Perceptually Lossless Medical Image Coding", IEEE Transactions on Medical Imaging, Volume 25, No. 3, March 2006, Pages 335-344.

All three articles disclosed the same perceptually lossless coding core structure applied to monochrome, colored and medical images, respectively. This core structure is based on a monochrome HVS model which was duplicated for color and extended for medical image compression. The duplication for the visually lossless color coder therefore has three identical monochrome HVS model, one for each color channel. The first and the third coder only accept greyscale images and do not operate on color images. Coders disclosed in these articles operate on a quantized-transformed (QT) image prior to bit-plane encoding to generate a set of estimations. These coders model two general aspects of the HVS, visual masking and visual acuity. These two HVS aspects are implemented based on a comparative model which measures the difference between reference signals and manipulated signals. Here, the reference and manipulated signals are represented by the reference transformed (RT) image and QT image, respectively. Initially, visual weighting is applied to both the RT and the QT image to gauge the visual acuity of the HVS. This is followed by visual masking computation for both the QT and the RT image. A set of visual distortions is then generated from the difference between the masking outputs of the RT and the QT images. Thereafter a perceptual error is determined by comparing the distortions levels with subjectively determined thresholds. If a distortion level is below the threshold point, the sample point in the transformed image under evaluation is then filtered to the corresponding (perceptually lossless) threshold point. This system operates in the DWT domain only.

In order to provide an improved performance in compression ratio and/or quality, there is a need to have a more accurate HVS model with low complexity which could be applied to all types of still images and moving images (videos).

The present invention seeks to limit, reduce, overcome, or ameliorate one or more of the above disadvantages by providing an improved perceptually lossless image coding technique. This technique may have a different HVS model that has lower complexity and better modelling accuracy. In addition, a perceptually enhanced image coding component or technique is introduced. The picture enhancement operations may be embedded within an image encoder using this component. This ensures that qualities of compressed pictures are visually better or equal to reference (original/raw) pictures.

SUMMARY OF THE INVENTION

According to a first aspect of the invention, there may be provided a method of generating perceptually lossless compression of image data or perceptually enhanced compression of image data including the steps of;

receiving an image;

color transforming the received image to a desired color space, forming converted color-space (CCS) images;

transforming the CCS images into transformed CCS images;

applying quantization to the transform CCS images to form quantized CCS images;

processing the transformed or quantized CCS images using an image processor to produce optimized CCS images that are perceptually lossless or perceptually enhanced in quality; and encoding the optimized CCS images for subsequent storage and/or transmission.

According to a second aspect of the invention, there may be provided apparatus for generating perceptually lossless image data or perceptually enhanced image data including:

a color transform unit for color transforming a received image to a desired color space, forming converted color-space (CCS) images;

a transform unit for receiving CCS images and transforming the CCS images into transformed CCS images each containing a set of transform coefficients;

a quantization unit to quantize the transformed CCS images to form quantized CCS images;

an image processor for receiving and processing transformed or quantized CCS images to produce optimized CCS images that are perceptually lossless or perceptually enhanced in quality; and;

an encoder for compressing the optimized CCS images;

wherein the compressed optimized CCS images are subsequently prepared for storage and/or transmission.

According to a third aspect of the invention, there may be provided a computer-readable medium including computer-executable instructions that, when executed on a processor, in a method of generating perceptually lossless image data or perceptually enhanced image data, directs a device to:

convert a received image into a desired color space forming converted color-space (CCS) images;

transform the CCS images into transformed CCS images consisting of a set of transform coefficients;

quantize the transformed CCS images to form quantized CCS images;

process the transformed or quantized CCS images to produce optimized CCS images that are perceptually lossless or perceptually enhanced in quality; and encode (compress) the optimized CCS images.

According to a fourth aspect of the invention, there may be provided a method of transmitting perceptually lossless compressed image data or perceptually enhanced compressed image data over a transmission medium including the steps of:

inputting a set of images to a color transform unit for color transforming a received image to a desired color space, forming converted color-space (CCS) images;

transforming the CCS images to form transformed CCS images;

quantizing the transformed CCS images to form quantized CCS images;

processing the transformed or quantized CCS images with an image processor to generate optimized CCS images that are perceptually lossless or perceptually enhanced in quality;

compressing each optimized CCS image with an encoder; and transmitting the compressed optimized CCS images over the transmission medium.

In a suitable form of the invention, the color transforming step, and/or components adapted to perform the color transforming step, may be omitted, bypassed, nulled, or set at a one to one ratio.

In a suitable form of the invention, the quantization step, and/or components adapted to perform the quantization step, may be omitted, bypassed, nulled, or set at a one to one ratio.

According to a fifth aspect of the invention, there may be provided a method of generating perceptually lossless compression of image data or perceptually enhanced compression of image data including the steps of;

receiving an image;

transforming the image;

processing the image using an image processor to produce optimized images that are perceptually lossless or perceptually enhanced in quality; and encoding the optimized images for subsequent storage and/or transmission.

According to a sixth aspect of the invention, there may be provided an apparatus for generating perceptually lossless image data or perceptually enhanced image data including:

a transform unit for receiving images and transforming the images into transformed images each containing a set of transform coefficients;

an image processor for receiving and processing transformed images to produce optimized images that are perceptually lossless or perceptually enhanced in quality; and;

an encoder for compressing the optimized images;

wherein the compressed optimized images are subsequently prepared for storage and/or transmission.

According to a seventh aspect of the invention, there may be provided a computer-readable medium including computer-executable instructions that, when executed on a processor, in a method of generating perceptually lossless image data or perceptually enhanced image data, directs a device to:

transform the images into transformed images, each consisting of a set of transform coefficients;

process the transformed images to produce optimized images that are perceptually lossless or perceptually enhanced in quality; and encode (compress) the optimized images.

According to an eighth aspect of the invention, there may be provided a processor adapted to receive transformed images containing a set of transform coefficients, and adapted to process the transformed images to produce optimized images that are perceptually lossless or perceptually enhanced in quality and suitable for compression by an encoder.

The optimized images may be perceptually lossless and thus visually indistinct compared with the received image when the optimized images are inverse transformed and converted back to the domain of the received image.

The optimized images may be perceptually enhanced and have perceptually enhanced picture quality compared with the received image when the optimized images are inverse transformed and converted back to the domain of the received image. The picture quality may be substantially enhanced.

The invention may comprise a color transform unit for color transforming a received image to a desired color space. The colour transformed images may form converted color-space (CCS) images.

The invention may comprise a quantization unit to quantize the transformed images to form quantized images.

The colour transformed images may be any one or more of luminance (Y), chrominance-blue ($C_b$) or chrominance-red ($C_r$) images.

The quantization unit may quantize the transform coefficients to form a set of quantized images consisting of quantized transform coefficients and the quantized images are then transmitted to the image processor.

The transform unit may be a discrete wavelet transform unit (DWT) or a discrete cosine transform (DCT).

The image processor may incorporate characteristics of the human visual system (HVS) to generate optimized images.

The image processor may include a signal mapping unit to map pixels in the CCS images to corresponding CCS transform-domain coefficients, forming mapped CCS images.

The image processor may further include a visual masking estimation unit which utilizes the transformed or quantized CCS images to determine a level of masking and output a visual masking profile.

The image processor may further include a contrast sensitivity unit for receiving the mapped CCS images to determine the contrast and magnitude sensitivity level of the mapped CCS images and output the contrast sensitivity profile for the mapped CCS images.

The image processor may further include an activity unit for receiving the mapped CCS images to calculate the activity level in the mapped CCS images and output an activity estimation profile.

The image processor may further include a base error unit for receiving the mapped CCS images along with the transformed or quantized CCS images to estimate a base error magnitude at or below a visibility threshold and output a base error magnitude profile.

The image processor may further include a perceptual error estimation unit for receiving the visual masking profile, contrast sensitivity profile, activity estimation profile and base error magnitude profile to determine the perceptual error estimation at or below the given threshold.

The image processor may further include an enhancement unit for receiving the mapped CCS images along with the transformed or quantized CCS images to determine where and how much enhancement is to be applied to the transformed or quantized CCS images and then outputting a resulting enhancement profile representing where and how much information should be enhanced.

The image processor may further include a low luminance/chrominance contrast unit for receiving the mapped CCS images to determine a low luminance/chrominance contrast profile.

The image processor may further include a visual optimization unit for optimizing the transformed or quantized CCS images based on the enhancement profile, the low luminance/chrominance contrast profile, the quantizer, the transformed and the quantized CCS images and the perceptual error estimation to generate the optimized CCS images for compression.

The encoder may compress the optimized CCS images for subsequent storage and/or transmission.

The received image may be divided into luminance and chrominance components.

The visibility threshold may be the JNND level.

BRIEF DESCRIPTION OF THE DRAWINGS

Preferred embodiments of the invention will hereinafter be described, by way of non-limiting examples only, with reference to the drawings in which.

DETAILED DESCRIPTION OF THE PREFERRED EMBODIMENTS

Figure 1:
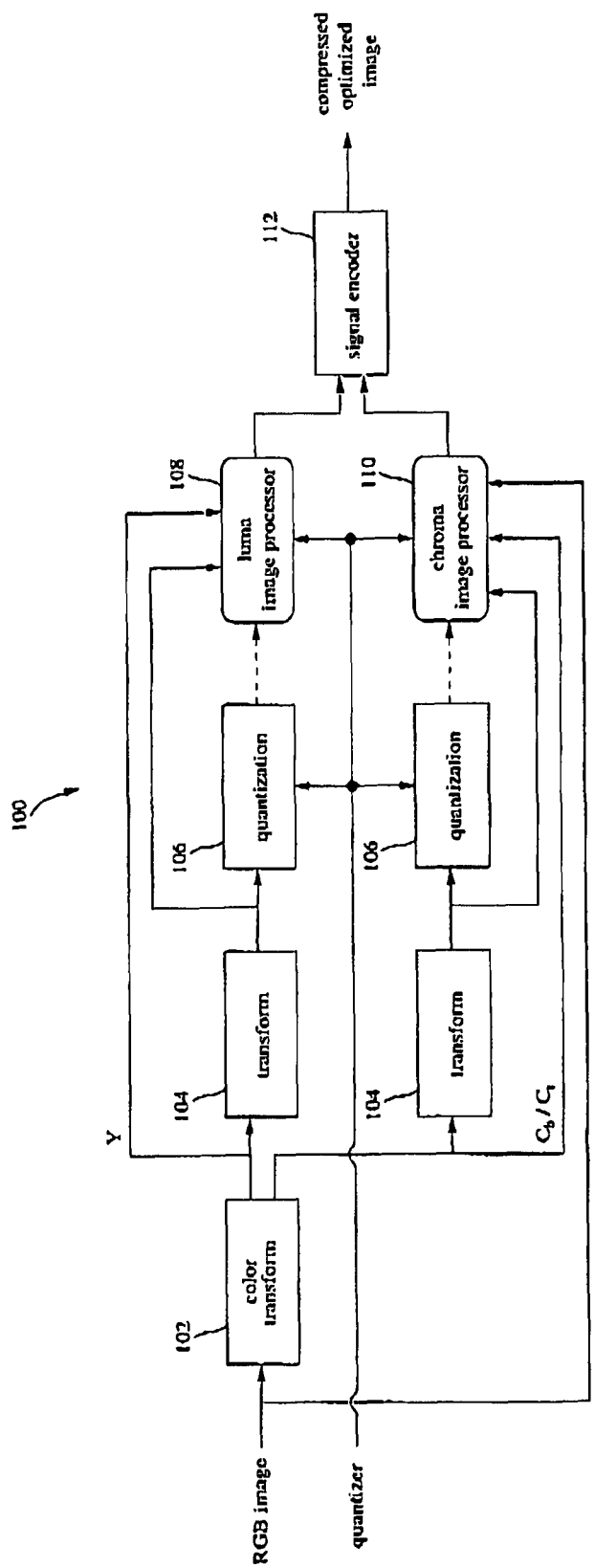
FIG. 1 is a block diagram of apparatus used to generate perceptually lossless and perceptually enhanced compressed images.

With reference to FIG. 1 there is shown a block diagram of a system or apparatus (100) used to provide compression of image data to a quality level that can either be perceptually lossless or perceptually enhanced. Initially an RGB (red, green, blue) image is input to a color transform (102). The input RGB image is converted by color transform (102) into an alternative color space, such as $YC_bC_r$, where "Y" is a luminance signal which corresponds to the intensity variation of the original signal and "$C_b$", "$C_r$" comprise the chrominance signals or color difference signals. In suitable forms of the invention it is also envisaged that the color conversion operations, and/or components adapted to perform the color conversion operations, may be omitted, bypassed, nulled, or set at a one to one ratio, particularly where monochrome images are input to the color transform (102). The luminance signal output from the color transform (102) is then input to a transform unit (104) as are chrominance signals. The transform unit (104) projects pixel domain pictures of individual channels (Y, $C_b$ and $C_r$) to an alternative signal domain. Examples of transforms that can be used include the discrete wavelet transform (DWT) and the discrete cosine transform (DCT) among others. In this case a discrete wavelet transform is used. The output from transform (104) is a series of transform coefficients that forms the transform image. The transformed luma image and the quantizer are input directly to quantization (106) to produce the quantized luma image. The quantization unit (106) provides quantization of the transform coefficients which maps the transform coefficients from a set of values to another. The quantizer depicts a set of parameters that determines the manner and the level of quantization applied to the transformed image. In suitable forms of the invention it is also envisaged that the quantization operations, and/or components adapted to perform the quantization operations, may be omitted, bypassed, nulled, or set at a one to one ratio. The transform luma image, the luma (Y) image that is output from the color transform (102), the quantized image from quantization (106) and the quantizer are inputs to a luma image processor (108) to generate the optimized luma image. Similarly, the output from the transform (104) produces a series of transform chroma coefficients that are input to quantization unit (106) and are also directly input to a chroma image processor (110). Also input to the chroma image processor (110) are the quantized chroma image that have been output from quantization (106), the original RGB image, chroma ($C_b$ and $C_r$) images and the quantizer.

The respective outputs from the luma image processor (108) and chroma image processor (110) are optimized luma (Y) image and optimized chroma ($C_b$ and $C_r$) images. Each of these is input to a signal encoder (112), which may include some form of signal rearrangements followed by entropy coding. For JPEG based encoding system, the signal encoder (112) includes zigzag, run-length and Huffman coding. For JPEG2000 based encoding system, the signal encoders (112) is represented by the EBCOT (embedded block coding with optimized truncation) coder. All information in the luma and the chroma images are then encoded and an optimized compressed image bitstream results from the output of the signal encoder (112).

Figure 2:
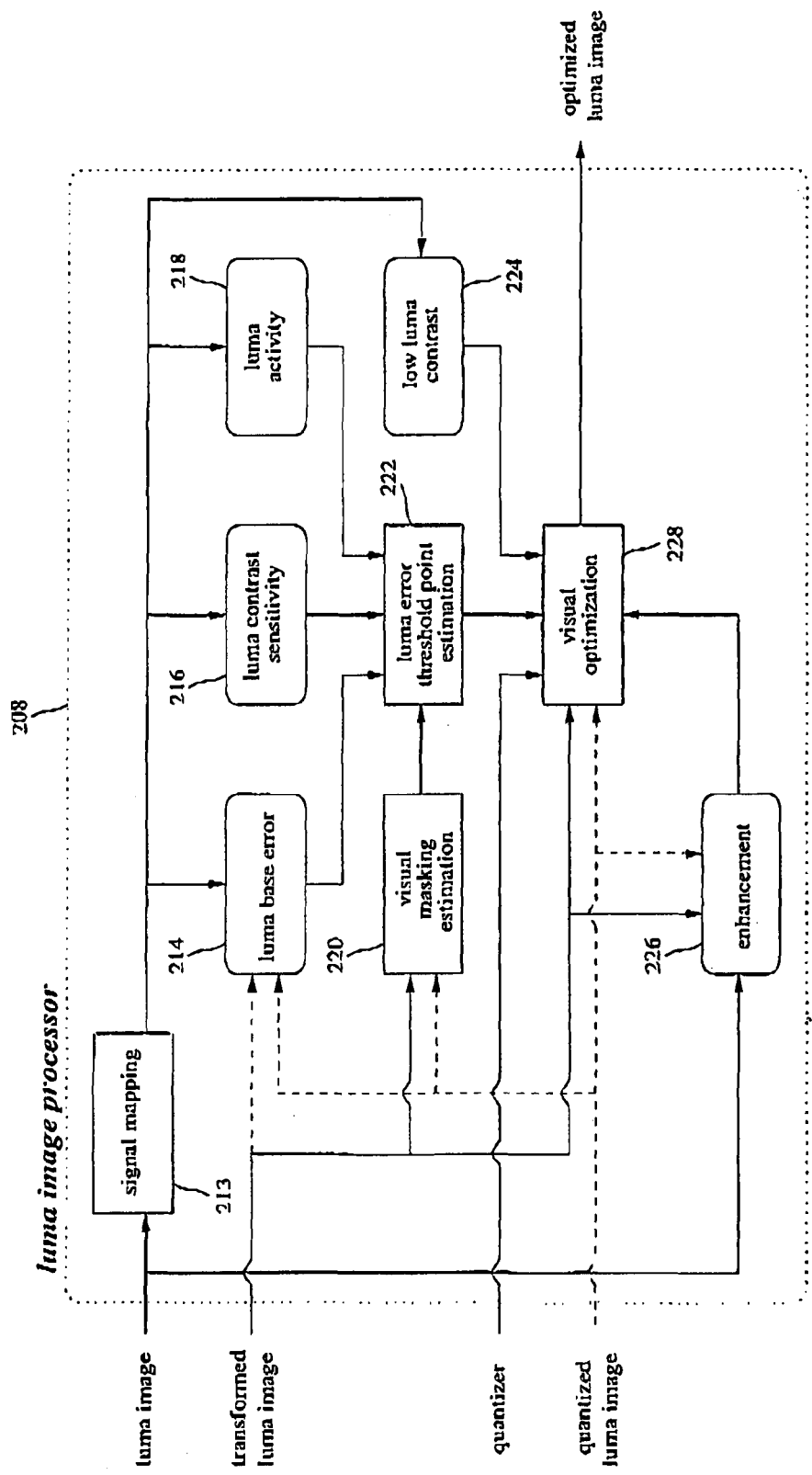
FIG. 2 is a block diagram of a luma image processor of the apparatus of FIG. 1.

Referring to FIG. 2 there is shown a more detailed block diagram of the luma image processor (108). It is indicated by corresponding reference (208) in FIG. 2. The luma image processor (208) operates in two modes for luma components, perceptual lossless mode and perceptually enhanced mode. In the perceptual lossless mode, the luma image processor removes imperceptible information in the quantized or transformed luma image. This is carried out in a fashion which reshapes the probability distribution of signals (containing all perceptible information) to be encoded in manners that allow for more efficient entropy encoding, leading to improve compression ratios. In the perceptually enhanced mode, the luma image processor enhances perceived picture quality of the quantized or transformed luma image prior to signal encoding. The perceptual enhancement mode provides three additional modes. The first mode maximises the compression ratio while maintaining picture quality of the optimized luma image at or above the transformed luma image. This is equivalent to having the de-quantized, inverse transformed optimized luma image with a visual quality at or above the luma image. The second mode maximises the picture quality of the optimized luma image regardless of the compression ratio and in the third mode the luma image processor balances between enhancement in picture quality and compression ratio gain following the rate versus quality (R-Q) curve. The R-Q curve is similar conceptually to the rate versus distortion (R-D) curve, but is concerned with quality rather than distortion. Enhancement is carried out in a fashion which reshapes the probability distribution of signals to be encoded in manners that lead to more efficient entropy encoding, thus higher compression ratios. The luma image processor (208) produces an optimized luma image in the domain of transform (104). The preferred transform is the discrete wavelet transform (DWT). However, other transforms such as the discrete cosine transform (DCT) may be used. Processor (208) incorporates characteristics of the human visual system (HVS). These include luminance contrast sensitivity, activity (texture and detail) discrimination, low luminance contrast discrimination and visual masking.

Figure 15:
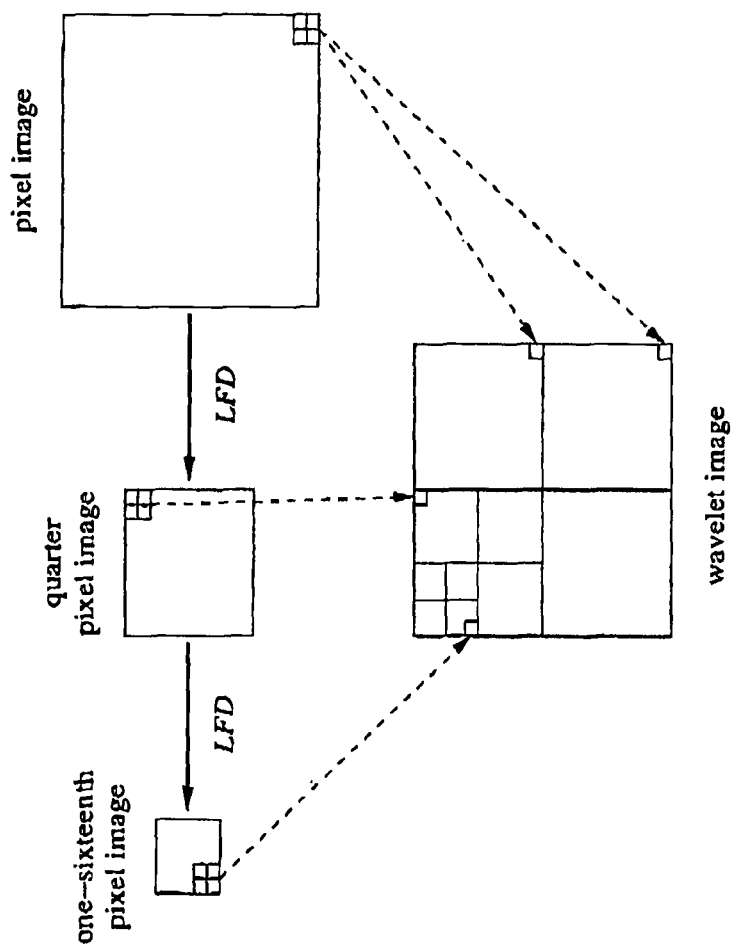
FIG. 15 is a block diagram showing the relationship between data samples resulting from signal mapping operations.

Referring again to FIG. 2, the pixel-domain luma image is input to signal mapping unit (213) which map each transform-domain luma signal from the transformed luma image generated by transform unit (104) to pixels in the luma image in the same spatial location. For multi-resolution transforms such as the discrete wavelet transform (DWT), signal mapping of lower resolutions DWT-domain coefficients may be carried out recursively through simple lowpass filtering followed by decimation (or averaging) of the lowpass luma image. Each successive recursion maps filtered and decimated signals to progressively lower resolution transformed coefficients. FIG. 15 illustrates the spatial and resolution relationship between DWT coefficients and mapped pixel domain sample (pixel image, quarter pixel image and one-sixteenth pixel image). This relationship is formalized as $$z_{luma/chroma}[l, i, j] \xrightarrow[\forall i,j]{} X_{luma/chroma}[l, \theta, m, n] \quad (1)$$

where $z_{luma/chroma}[l,i,j]$ is the pixel sample at resolution l and spatial location (i,j), $X_{luma/chroma}[l,\theta,m,n]$ is the DWT coefficient at orientation θ and spatial-frequency location (m,n), $2m \le i \le 2m+1$ and $2n \le j \le 2n+1$. Note that $0 \le l \le (L_{max}-1)$ with $L_{max}$ denoting the number of resolutions. The quarter pixel image is derived from low-pass filtering and down-sampling (LPD) of the pixel image. Similarly, the one-sixteenth pixel image is derived through LPD of the quarter pixel image. The output of the signal mapping unit (213) is fed to luma base error unit (214), luma contrast sensitivity unit (216), a luma activity unit (218) and luma low contrast unit (224). The luma base error unit (214) estimates the base error magnitude at or below a threshold level, such as the just-not-noticeable difference (JNND) level. Other varying threshold levels corresponding to varying distortion levels (both perceptible and imperceptible) can be used. The luma base error can be determined by the mapped luma image, transform-domain (quantized and transformed) luma image or both. Therefore, unit (214) takes in the mapped luma image and optionally either the transformed luma image or the quantized luma image. If the quantization step size is approximately one, then the quantized luma image could be used instead of the transformed luma image. The luma base error unit (214) outputs a luma base error profile which is input to the luma perceptual error estimation unit (222).

The luma contrast sensitivity unit (216) determines the luminance contrast and luminance sensitivity level of the HVS. This unit has the mapped luma image as an input and generates at its output a luma contrast sensitivity profile of the input image. The luma activity unit (218) calculates the activity level in the luminance domain. The activity level is dependent on texture and detail levels of the input luma image. The input to unit (218) is the mapped luma image. Its output there is a luma activity estimation pro file.

The low luma contrast unit (224) specifically identifies low luminance regions in the mapped luma image with strong contrast. It takes as its input the mapped luma image and generates a low luma contrast discrimination profile.

The outputs to each of units (214), (216) and (218) are inputs to the luma perceptual error estimation unit (222). The estimation unit unit (222) also accepts, as an input, the output from the visual masking estimation (220) which computes the visibility of visual signals subjected to the visual masking phenomenon of the HVS. Visual masking occurs when a visual signal inhibits the visibility of another visual signal. This in turn affects the visibility level of distortions. There are three forms of visual masking: spatial masking; orientation masking and frequency masking. Visual masking estimation unit (220) may implement all or any combination of these three forms of masking. Visual masking of individual sample is computed as $$R_{luma}[l, \theta, m, n] = 1 - \frac{|X_{luma}[l, \theta, m, n]|}{\frac{1}{N_M}\sum_{u=m-w_M}^{m+w_M}\sum_{v=n-w_M}^{n+w_M}|X_{luma}[l, \theta, u, v]|} \quad (2)$$

Where $X_{luma}[l,\theta,m,n]$ is the coefficient of transformed luma image at resolution level l, orientation θ, and spatial location (m,n). $R_{luma}[l,\theta,m,n]$ is the masking response and $w_m$ the windowed area for masking estimation. $N_m$ is the window size defined as $N_M=(2w_M+1)^2$. If the quantization step size is approximately one, then the quantized luma image from quantizer (106) can be used to compute masking instead of the transformed luma image. The output from the visual masking estimation (220) is a visual masking level associated with each coefficient sample for a given input quantize or transformed luma image.

The luma perceptual error estimation unit (222) determines the maximum luminance error that is at or below a threshold (e.g. JNND) level from the luma base error (214) subjected to visual masking (220), luma contrast sensitivity (216) and luma activity level (218). This error estimation in (222) may also be set to any threshold points other than the JNND level, perceptible or imperceptible. Unit (222) calculates the maximum perceptual error threshold associated with each coefficient in the transform-domain. Inputs for unit (222) are the luma base error magnitude profile, the luma contrast sensitivity profile, the luma activity profile and the visual masking profile. The luma perceptual error threshold (JNND) for resolution l, orientation θ at spatial location (m,n) is defined as $$t_{JNND_{luma}}[l,\theta,m,n] = R_{luma}[l,\theta,m,n] \times e_{luma}[l,m,n] \times c_{luma}[l,m,n] \times a_{luma}[l,m,n] \quad (3)$$

where $R_{luma}[l,\theta,m,n]$, $e_{luma}[l,m,n]$, $c_{luma}[l,m,n]$ and $a_{luma}[l,m,n]$ are, respectively, the masking, base error, contrast sensitivity and activity level components defined by eqn. (2), (20), (30) and (46).

An enhancement unit (226) receives inputs from the luma image and the transformed luma image. If the quantizer is approximately one, then the quantized image may be used instead of the transformed image as an input. Unit (226) generates an enhancement profile in the transform-domain and forwards this to a visual optimization unit (228). In short, enhancement unit (226) informs visual optimization unit (228) where and how much enhancement should be made in the quantized or transformed luma image.

The visual optimization unit (228) accepts the enhancement profile from the enhancement unit (226), the quantized luma image from quantizer unit (106), the transformed luma image from transform (104), the estimated maximum luma error threshold from perceptual error estimation unit (222), the low luma contrast profile from the low luma contrast unit (224) and the quantizer. Unit (228) optimizes the transform domain luma image in two modes: perceptually lossless and perceptually enhanced mode. In perceptually lossless mode, visual optimization unit (228) removes imperceptible information in the quantized or the transformed luma image. In the perceptually enhanced mode, unit (208) enhances the perceived picture quality of the optimized luma image compared with the transform luma image. This is equivalent to having the de-quantized, inverse transformed optimized luma image with enhanced visual quality over the luma image. Perceptual enhancement itself has three additional modes. The first mode it maximises the compression ratio while maintaining picture quality of the optimized image at or above the transformed luma image. In the second mode it maximises the picture quality of the optimized luma image regardless of the compression ratio. In the final mode it provides a balance between enhancement in picture quality and compression ratio that follows the rate versus quality (R-Q) curve. The output from the visual optimization unit (228) is the optimized luma image (in the transform-domain) which is input to the signal encoder (112). If the quantizer is approximately one, then the quantized luma image may be used in unit (112). Otherwise, the transformed luma image is used. If the quantized luma image is used, then the quantizer is also used during the process of determining the optimized luma image. An optimized JNND transform coefficient is written as $$X_{luma_{JNND}}[l,\theta,m,n] = \max_{\forall b} \{X_{luma_b}[l,\theta,m,n] | (\zeta_{JNND1_{luma}} \tilde{} \zeta_{JNND2_{luma}})\} \quad (4)$$

where $\zeta_{JNND1_{luma}} = |X_{luma}[l,\theta,m,n] - X_{luma_b}[l,\theta,m,n]| \leq (t_{JNND_{luma}}[l,\theta,m,n] \times \upsilon_{luma}[l,m,n])$ and $\zeta_{JNND2_{luma}} = |X_{luma}[l,\theta,m,n] - X_{luma_{b+1}}[l,\theta,m,n]| > (t_{JNND_{luma}}[l,\theta,m,n] \times \upsilon_{luma}[l,m,n])$. $t_{JNND_{luma}}[l,\theta,m,n]$ is defined in eqn. (3) and $$\upsilon_{luma}[l,m,n] = \begin{cases} 0.5, & (\max_{\forall i,j}(d_{LC_{luma}}[l,i,j])) > 0 \\ 1, & \text{otherwise} \end{cases} \quad (5)$$

with $2m \leq i \leq 2m+1$ and $2n \leq j \leq 2n+1$. $d_{LC_{luma}}[l,i,j]$ is defined in eqn. (71). The filtered transform coefficient is defined as $$x_{luma_b}[l,\theta,m,n] = \left\lfloor \frac{X_{luma}[l,\theta,m,n]}{2^b} \right\rfloor \times 2^b \quad (6)$$

where lsb ≤ b ≤ msb−1 is the bit position and covers the range from the least significant bit (lsb) to the most significant bit (msb). The optimized enhanced (ENH) transform coefficient is defined as $$X_{luma_{ENH}}[l,\theta,m,n] = \max_{\forall b} \{X_{luma_b}[l,\theta,m,n] | (\zeta_{ENH1} \tilde{} \zeta_{ENH2})\} \quad (7)$$

where $\zeta_{ENH1} = |X_{luma}[l,\theta,m,n] - \bar{X}_{luma_b}[l,\theta,m,n]| \leq t_{EL_{luma}}[l,\theta,m,n]$ and $\zeta_{ENH2} = |X_{luma}[l,\theta,m,n] - \bar{X}_{luma_{b+1}}[l,\theta,m,n]| > t_{EL_{luma}}[l,\theta,m,n]$. $t_{EL_{luma}}[l,\theta,m,n]$ is defined in eqn. (75) and $$\bar{X}_{luma_b}[l,\theta,m,n] = \left(\left\lfloor \frac{X_{luma}[l,\theta,m,n]}{2^b} \right\rfloor + 1\right) \times 2^b \quad (8)$$

Figure 3:
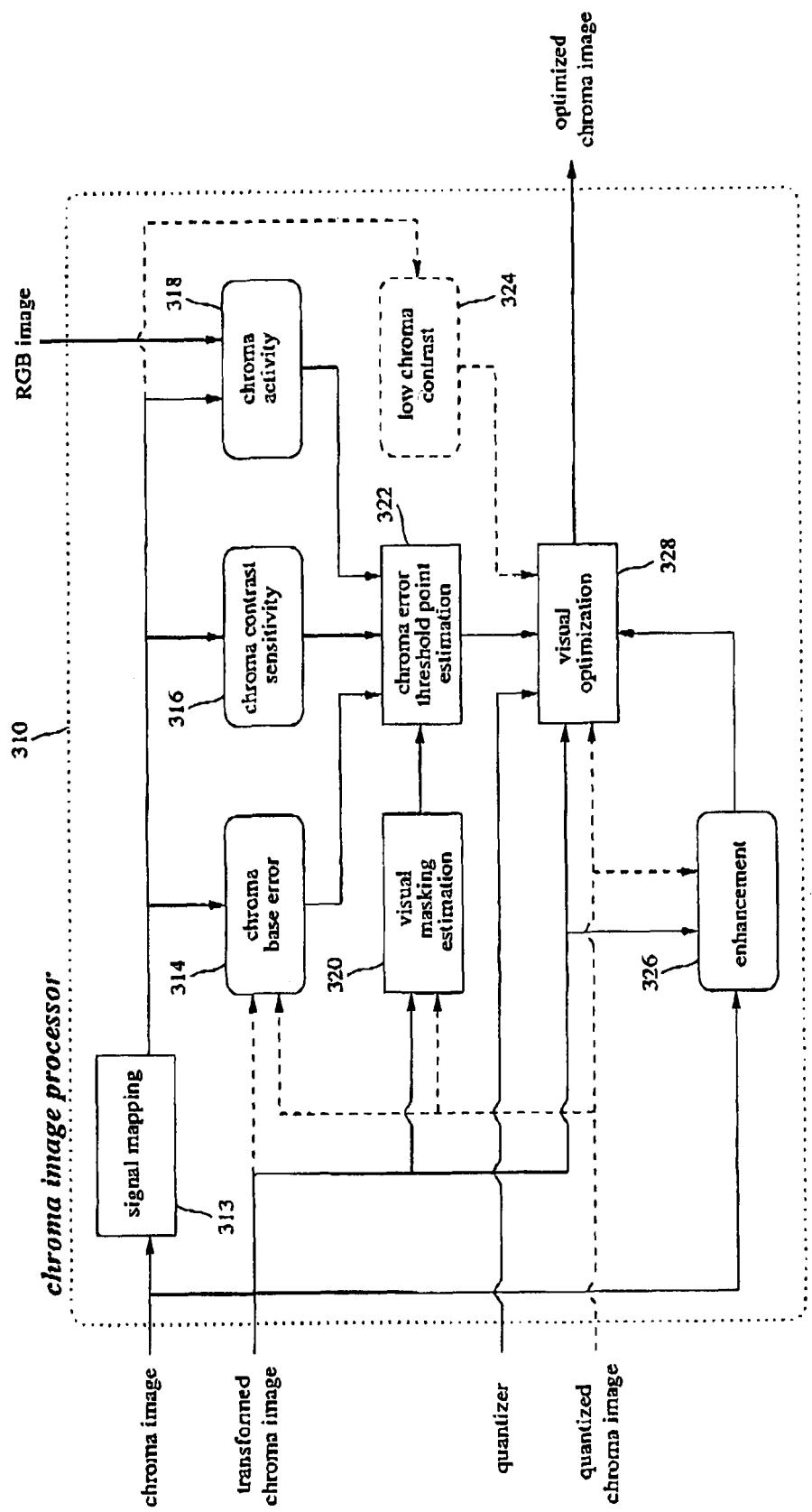
FIG. 3 is a block diagram of a chroma image processor of the apparatus of FIG. 1.

Referring to FIG. 3 there is shown a diagram of the chroma image processor (110). It is indicated by a corresponding reference (310) in FIG. 3. Similar to the luma image processor (208), the chroma image processor (310) operates in two modes for chroma components: perceptually lossless mode and perceptually enhanced mode. The perceptually enhanced mode provides three additional modes as in the case for the luma image processor (208). The chroma image processor (310) also incorporates the perceptual characteristics of the HVS as previously described in relation to the luma image processor (208).

The chroma image processor (310) includes a signal mapping unit (313), a chroma base error unit (314) and chroma contrast sensitivity unit (316), a chroma activity unit (318), visual masking estimation unit (320), chroma perceptual error estimation unit (322), enhancement unit (326), visual optimization unit (328) and an optional low chroma contrast unit (324). Signal mapping unit (313) takes chroma image as inputs and maps pixels in chroma images to their corresponding signals in transform-domain chroma images. For multi-resolution transforms such as DWT, signal mapping of lower resolutions DWT-domain coefficients may be carried out recursively through simple lowpass filtering followed by decimation of the lowpass chroma image. Each successive recursion maps filtered and decimated signals to progressively lower resolution transformed coefficients. The chroma base error unit (314) operates in a similar fashion to the luma base error unit (214) except it operates on chroma signals. Unit (314) estimates the chroma base error at or below a visibility threshold, such as the JNND level. Other varying threshold levels corresponding to varying distortion levels (both perceptible and imperceptible) can be used. The chroma base error can be determined by the mapped chroma image, transform-domain (quantized and transformed) chroma image or both. Therefore, inputs to unit (314) are the mapped chroma image and optionally either the transformed chroma image or the quantized chroma image. If the quantization steps size is approximately one, then the quantized chroma image could be used instead of the transformed chroma image. The chroma threshold error unit (314) outputs a chroma base error profile which is then input to chroma perceptual error estimation unit (322).

The chroma contrast sensitivity unit (316) determines the chrominance contrast and chrominance sensitivity level of the HVS. This unit has the mapped chroma image as input and generates as its output a chroma contrast sensitivity profile of the input image. The chroma activity unit (318) calculates the activity level in the chrominance domain. The activity level is dependent on texture and detail levels of the input chroma image. The unit (318) receives the mapped chroma image as input and outputs the chroma activity estimation profile.

The outputs from each of the units (314), (316) and (318) are input to the chroma perceptual error estimation unit (322). The estimation unit (322) also accepts as an input the output from visual masking estimation unit (320) which estimates the visibility of visual signals subjected to the visual masking phenomenon of the HVS. As with visual masking (220) of luma signals, visual masking (320) of chroma signals covers spatial, orientation, frequency or any combinations of these three masking channels. Visual masking (320) is computed from the input transform chroma image. Its definition takes the form of eqn. (2), but operates on chroma signals ($X_{chroma}$) rather than luma signals ($X_{luma}$). That is, $$R_{chroma}[l, \theta, m, n] = 1 - \frac{|X_{chroma}[l, \theta, m, n]|}{\frac{1}{N_M}\sum_{u=m-w_M}^{m+w_M}\sum_{v=n-w_M}^{n+w_M}|X_{chroma}[l, \theta, u, v]|}. \quad (9)$$

If the quantizer is approximately one, then the quantized chroma image from quantizer (106) can be used for masking computation instead of the transformed chroma image. The output from the visual masking estimation unit (320) is the chroma visual masking profile of the input image.

The chroma perceptual error estimation unit (322) accepts four inputs to estimate the maximum error that is at or below a threshold (e.g. JNND) level, subjected to visual masking, contrast sensitivity and activity level. As with the luma image processor (208), this error estimation may also be set to other threshold points other than the JNND level. It is defined as $$t_{JNND_{chroma}}[l,\theta,m,n] = R_{chroma}[l,\theta,m,n] \times e_{chroma}[l,m,n] \times c_{chroma}[l,m,n] \times a_{chroma}[l,m,n] \quad (10)$$

where $R_{chroma}[l,\theta,m,n]$, $e_{chroma}[l,m,n]$, $c_{chroma}[l,m,n]$ and $a_{chroma}[l,m,n]$ are the chroma visual masking profile, the chroma base error profile, the chroma contrast sensitivity profile and the chroma activity profile, defined by eqn. (9), (21), (31) and respectively. Unit (322) outputs the maximum chroma error threshold for each coefficient in the transform-domain chroma image.

The low chroma contrast unit (324) specifically identifies low chrominance regions in the mapped chroma image with strong contrast. It takes as its input the mapped chroma image and generates a low chroma contrast discrimination profile. The low chroma contrast unit (324) is an optional component of the chroma image processor (310).

An enhancement unit (326) receives inputs from the chroma image along with the transformed chroma image or the quantized chroma image. It generates an enhancement profile based on input images which is then forwarded to a visual optimization unit (328). If the quantizer is approximately one, then the quantized chroma image may be used instead of the transformed chroma image to generate the enhancement profile.

The visual optimization unit (328) receives the enhancement profile from the enhancement unit (226), the quantized chroma image from the quantizer unit (106), the transformed chroma image from transform (104), the maximum chroma error threshold form chroma perceptual error estimation (322), the quantizer and the optional low chroma contrast discrimination profile from the low chroma contrast unit (324). The unit (328) optimizes the transform-domain chroma image into two modes in a similar fashion to the visual optimization unit (228) of the luma image processor. These modes are the perceptually lossless mode and perceptually enhanced mode as previously described. The perceptually enhanced mode has three additional modes as previously described. If the quantizer is approximately one, the quantized chroma image may be used in place of the transformed chroma image. If the quantized chroma image is used, then the quantizer is also used to determine the optimized chroma image. For both the perceptually lossless and the perceptually enhanced modes, unit (328) reshapes the probability distribution of signals to be encoded in manners that allow for more efficient entropy encoding, leading to higher compression ratios.

The output from the visual optimization unit (328) is the optimized chroma image, in the transform-domain, which is then input to the signal encoder (112). Visual optimization operations for the chroma channels are structurally identical to that of the luma channels as given in eqns. (4)-(8), but operates on chroma signals with chroma profiles $t_{JNND_{chroma}}[l,\theta,m,n]$, $t_{EL_{chroma}}[l,\theta,m,n]$ and $d_{LC_{chroma}}[l,i,j]$. The chroma version (5) may, optionally, be redefined as $\upsilon_{chroma}[l,m,n]=1$.

Figure 4:
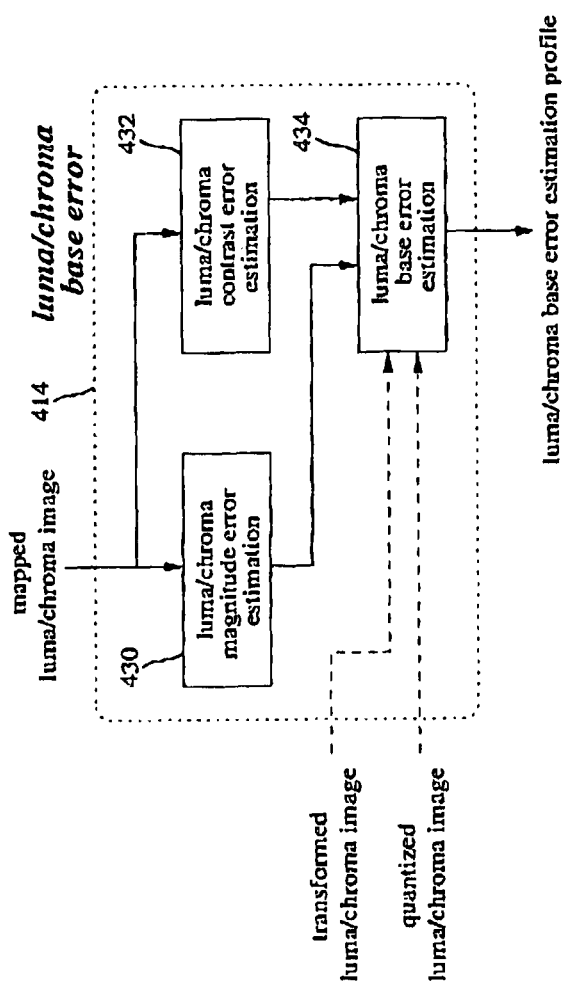
FIG. 4 is a block diagram of a luma/chroma base error unit.

In FIG. 4 there is shown a detailed block diagram of both the luma threshold error unit (214) and the chroma threshold error unit (314). It includes a luma/chroma magnitude error estimation unit (430) which computes the maximum allowable error based on absolute pixel luminance/chrominance level. Input to unit (430) is the mapped luma/chroma image ($z_{luma}$ and $z_{chroma}$) and it outputs the base luma/chroma magnitude error (ME). The luma and the chroma error sample at resolution level l and spatial location (m,n) are calculated as $$e_{ME_{luma}}[l, m, n] = f_{ME_{luma}}\left(\left[\frac{1}{4}\sum_{i=2m}^{2m+1}\sum_{j=2n}^{2n+1}z_{luma}[l, i, j]\right], l\right) \quad (11)$$

and $$e_{ME_{chroma}}[l, m, n] = f_{ME_{chroma}}\left(\left[\frac{1}{4}\sum_{i=2m}^{2m+1}\sum_{j=2n}^{2n+1}z_{chroma}[l, i, j]\right], l\right) \quad (12)$$

where the magnitude error profiles are derived through $$f_{ME_{luma}}(g,l) = \left(1 - \frac{\rho[g]}{\lfloor M/2 \rfloor}\right)^{(p_{ME_{luma}}+2(L_{max}-l))} \times o_{ME_{luma}} + \beta_{ME_{luma}} \quad (13)$$

and $$f_{ME_{chroma}}(g,l) = \quad (14)$$
$$\left|\left(1 - \frac{\rho[g]}{\lfloor M \cdot /2 \rfloor}\right)\right|^{(p_{ME_{chroma}}+2(L_{max}-l))} \times o_{ME_{chroma}} + \beta_{ME_{chroma}}$$

with ($0 \leq g < M$), M the maximum number of discrete luma/chroma levels (e.g., 256 levels for 8 bit pixels) and $\lfloor \ \rfloor$ the flooring operator. $p_{ME_{luma}}=4$ and $p_{ME_{chroma}}=4$ are the magnitude error profile shaping exponents for luma and chroma channels, respectively. $0 \leq l < L_{max}$ denotes the resolution and $L_{max}$ the maximum number of resolutions, both corresponding to the wavelet transform. $o_{ME_{luma}}=6$ and $\beta_{ME_{luma}}=2$ are the magnitude error profile normalization parameters for the luma channel. $o_{ME_{chroma}}=8$ and $\beta_{ME_{chroma}}=4$ are the corresponding versions for chroma channels. The indexing term $\rho[g]$ is given by $$\rho[g] = \begin{cases} g, & 0 \leq g < \lfloor M/2 \rfloor \\ M-g, & \text{otherwise} \end{cases} \quad (15)$$

The luma/chroma magnitude error is input to a luma/chroma base error estimation unit (434). The luma/chroma contrast error estimation unit (432) receives mapped luma/chroma image as input and it outputs a luma/chroma contrast error. These contrast errors (CE) at resolution level l and spatial location (m,n) are defined as $$e_{CE_{luma}}[l,m,n] = f_{CE_{luma}}(\min_{\forall i,j}(z_{luma}[l,i,j]),l) \quad (16)$$

and $$e_{CE_{chroma}}[l,m,n] = f_{CE_{chroma}}(\min_{\forall i,j}(z_{chroma}[l,i,j]),l) \quad (17)$$

where $2m \leq i \leq 2m+1$ and $2n \leq j \leq 2n+1$. The contrast error profiles are given by $$f_{CE_{luma}}(g,l) = \left(\frac{g}{M}\right)^{p_{CE_{luma}}+2l} \times o_{CE_{luma}} + \beta_{CE_{luma}} \quad (18)$$

and $$f_{CE_{chroma}}(g,l) = \left(\frac{g}{M}\right)^{p_{CE_{chroma}}+2l} \times o_{CE_{chroma}} + \beta_{CE_{chroma}} \quad (19)$$

with $p_{CE_{luma}}=1$ and $p_{CE_{chroma}}=1$ the contrast profile shaping exponents for luma and chroma channels, respectively. $o_{CE_{luma}}=1$ and $\beta_{CE_{luma}}=0$ are the contrast error normalization parameters for the luma channel. $o_{CE_{chroma}}=1$ and $\beta_{CE_{chroma}}=0$ are the corresponding versions for the chroma channels. The luma/chroma contrast error estimation unit (432) considers of both luma/chroma magnitude and contrast and computes the maximum allowable error based on the magnitude and contrast levels of mapped luma/chroma image. It receives as input the luma/chroma magnitude error from unit (430) and the luma/chroma contrast error from the unit (432). It outputs the luma/chroma base error estimation profile. Individual base error sample for the luma and chroma channels are calculated as $$e_{luma}[l,m,n] = \begin{cases} e_{CE_{luma}}[l,m,n], & e_{CE_{luma}}[l,m,n] < e_{ME_{luma}}[l,m,n] \\ e_{ME_{luma}}[l,m,n], & \text{otherwise} \end{cases} \quad (20)$$

and $$e_{chroma}[l,m,n] = \quad (21)$$
$$\begin{cases} e_{CE_{chroma}}[l,m,n], & e_{CE_{chroma}}[l,m,n] < e_{ME_{chroma}}[l,m,n] \\ e_{ME_{chroma}}[l,m,n], & \text{otherwise} \end{cases}$$

The transformed or quantized luma/chroma image may be used in unit (434) to provide additional modelling for the computation of the base error estimation profile. If the quantization step size is approximately one, the quantized luma/chroma image can be used instead of the transformed luma/chroma image for additional modelling. The output to unit (434) which represents the outputs from luma unit (214) and chroma unit (314) is then input to the luma perceptual error estimation unit (222) and chroma perceptual error estimation unit (322).

Figure 5:
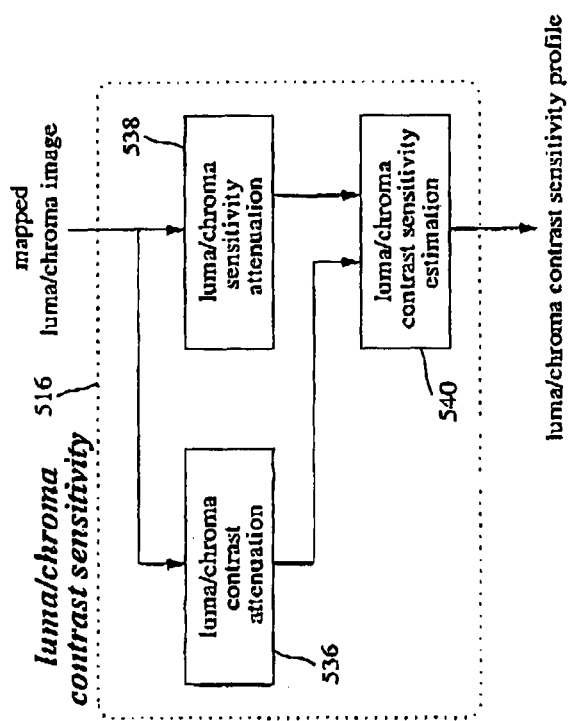
FIG. 5 is a block diagram of a luma/chroma contrast sensitivity unit.

Shown in FIG. 5 is a block diagram of a respective luma/chroma contrast sensitivity unit (516). For the respective luma and chroma channels this is equivalent to contrast sensitivity units (216) and (316). The mapped luma/chroma image is input to each of a luma/chroma sensitivity attenuator (538) and a luma/chroma contrast attenuator (536). The luma/chroma contrast attenuator (536) attenuates the input image according to the luma/chroma contrast sensitivity of the HVS. The contrast attenuation (CA) function for luma and chroma channels are defined as $$f_{CA_{luma}}(g,l) = 1 - \left(1 - \left(\frac{g}{M}\right)\right)^{p_{CA_{luma}}+2(L_{max}-l-1)} \quad (22)$$

and $$f_{CA_{chroma}}(g,l) = 1 - \left(1 - \left(\frac{g}{M}\right)\right)^{p_{CA_{chroma}}+2(L_{max}-l-1)} \quad (23)$$

where g and l are pixel magnitude and resolution level, respectively. $p_{CA_{luma}}=8$ and $p_{CA_{chroma}}=8$ are the attenuation exponents for the luma and chroma contrast attenuation functions, respectively. Accordingly, the attenuated signal of $z_{luma}[l,i,j]$ and $z_{chroma}[l,i,j]$ at resolution level l, are written as $$a_{C_{luma}}[l,i,j] = f_{CA_{luma}}(z_{luma}[l,i,j],l) \quad (24)$$

and $$a_{C_{chroma}}[l,i,j] = f_{CA_{chroma}}(z_{chroma}[l,i,j],l) \quad (25)$$

The luma/chroma sensitivity attenuator (538) attenuates the input image to the luma/chroma magnitude sensitivity level of the HVS. Unit (538) outputs the luma/chroma magnitude profiles of the input image. The sensitivity attenuation (SA) function for luma and chroma channels are define as $$f_{SA_{luma}}(g,l) = 1 - \left(\left(\frac{2g}{M}\right) - 1\right)^{p_{SA_{luma}}+2(L_{max}-l-1)} \quad (26)$$

and $$f_{SA_{chroma}}(g,l) = 1 - \left|\frac{\rho[g]}{\lfloor M/2 \rfloor}\right|^{p_{SA_{chroma}}+2(L_{max}-l-1)} \quad (27)$$

where $p_{SA_{luma}}=4$ and $p_{SA_{chroma}}=4$ are the exponents that shapes the luma and chroma sensitivity attenuation functions, respectively. $\rho[g]$ is given in eqn. (15). Attenuated signals of $z_{luma}[l,i,j]$ and $z_{chroma}[l,i,j]$ are written as $$a_{S_{luma}}[l,i,j] = f_{SA_{luma}}(z_{luma}[l,i,j],l) \quad (28)$$

and $$a_{S_{chroma}}[l,i,j] = f_{SA_{chroma}}(z_{chroma}[l,i,j],l) \quad (29)$$

The luma/chroma contrast sensitivity estimation unit (540) accounts for both luma/chroma magnitude and contrast sensitivity. It takes the outputs of unit (536) and (538) and outputs luma/chroma contrast sensitivity profiles which are defined, relative to resolution level l and spatial location (m,n), as $$c_{luma}[l,m,n] = \begin{cases} c_{CA_{luma}}[l,m,n], & c_{CA_{luma}}[l,m,n] > c_{CA_{luma}}[l,m,n] \\ c_{SA_{luma}}[l,m,n], & \text{otherwise} \end{cases} \quad (30)$$

for luma and $$c_{chroma}[l,m,n] = \max_{\forall i,j}(a_{S_{chroma}}[l,i,j]) \quad (31)$$

for chroma where $$c_{SA_{luma}}[l,m,n] = \max_{\forall i,j}(a_{S_{luma}}[l,i,j],l) \quad (32)$$

with $2m \le i \le 2m+1$ and $2n \le j \le 2n+1$. The contrast component for the luma channel is taken as $$c_{CA_{luma}}[l,m,n] = (1 - c_{SA_{luma}}[l,m,n]) \times (f_{CA_{luma}}(y[l,m,n],l)) \quad (33)$$

where $$y[l,m,n] = |\max_{\forall i,j}(z[l,i,j]) - \min_{\forall i,j}(z[l,i,j])| \quad (34)$$

with $2m-w_r \le i \le 2m+w_r$ and $2n-w_c \le j \le 2n+w_c$. $w_r$ and $w_c$ are the vertical and horizontal radius of the windowed area. The output of unit (540) is subsequently input to their respective luma (222) and chroma (322) perceptual error-estimation units.

Figure 6:
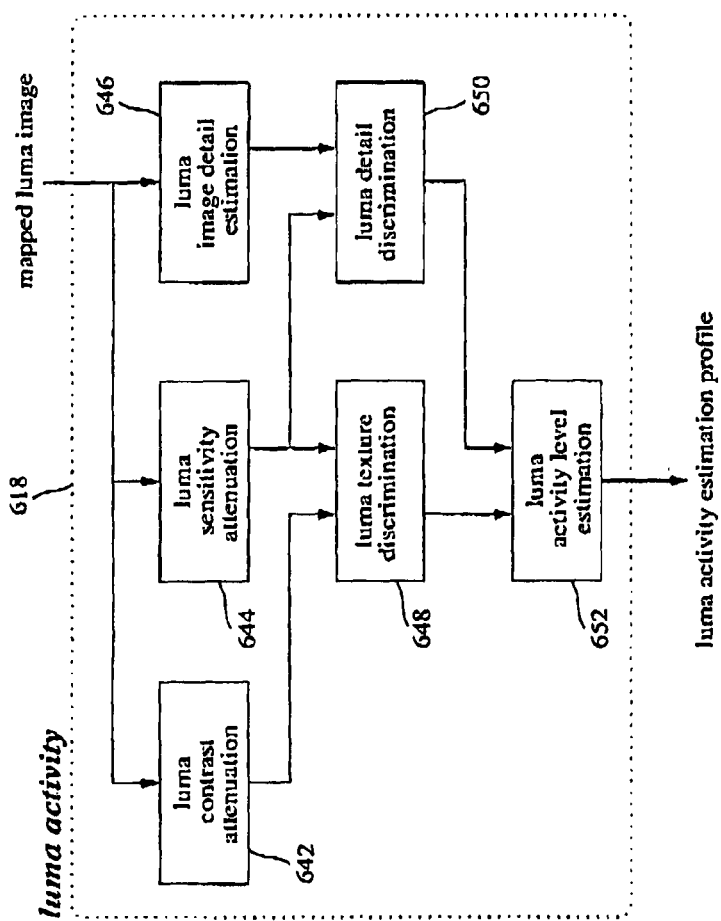
FIG. 6 is a block diagram of a luma activity unit.

FIG. 6 shows a detailed block diagram of the luma activity unit (218) which is labelled as (618). Initially the mapped luma image is input to a luma contrast attenuation unit (642), luma sensitivity attenuation unit (644) and luma image detail estimation unit (646). Luma contrast attenuation unit (642) attenuates the input luma image according to the luma contrast sensitivity levels of the HVS. The unit (642) outputs a luma contrast profile, defined in eqn. (22), which is subsequently input to luma texture discrimination unit (648). The luma sensitivity attenuation unit (644) attenuates the input luma image according to the luma magnitude sensitivity levels of the HVS. It outputs the luma magnitude profile, defined in eqn. (26), which is then subsequently input to luma texture discrimination unit (648) and luma detail discrimination unit (650). Luma image detail estimation unit (646) extracts detailed structures in the input image. It outputs the luma structure (detail) profile of the input image. Luma detail of individual sample is computed as follows $$e_{D_{luma}}[l,i,j] = \frac{a_{A_{luma}}[l,i,j]}{\frac{1}{N_D}\sum_{u=i-w_r}^{i+w_r}\sum_{v=j-w_c}^{j+w_c} a_{A_{luma}}[l,u,v]} \quad (35)$$

where $N_D = (2w_r+1) \times (2w_c+1)$. $w_r$ and $w_c$ denote the vertical and horizontal window radius with $$a_{A_{luma}}[l,i,j] = (a_{S_{luma}}[l,i,j] \times M) - 1. \quad (36)$$

Luma texture discrimination unit (648) receives inputs from luma contrast attenuation unit (642) and luma sensitivity attenuation unit (644). It identifies and locates texture information in the luma image which may be classified according to low, medium or high level texture. It outputs the luma texture discrimination profile which is then forwarded to luma activity level estimation unit (652). A texture discriminated sample is defined as $$d_{T_{luma}}[l,i,j] = \begin{cases} 1, & (L_{C_{luma}} < a_{C_{luma}}[l,i,j] < U_{C_{luma}}) \wedge (a_{S_{luma}}[l,i,j] > T_{S_{luma}}) \\ 0, & \text{otherwise} \end{cases} \quad (37)$$

The upper contrast discrimination bound is computed as $$U_{C_{luma}} = \frac{1}{D_{l_r} \times D_{l_c}} \sum_{i=0}^{D_{l_r}} \sum_{j=0}^{D_{l_c}} a_{C_{luma}}[l,i,j] \quad (38)$$

where $D_{l_r}$ and $D_{l_c}$ are the row and column dimensions of the attenuated contrast image, $a_{C_{luma}}$, at resolution l. The lower contrast discrimination bound is computed as $$L_{C_{luma}} = U_{C_{luma}} - \sum_{i=0}^{D_{l_r}} \sum_{j=0}^{D_{l_c}} |U_{C_{luma}} - a_{C_{luma}}[l,i,j]|. \quad (39)$$

The sensitivity discrimination threshold of eqn. (37) is $$T_{S_{luma}} = \frac{1}{D_{l_r} \times D_{l_c}} \sum_{i=0}^{D_{l_r}} \sum_{j=0}^{D_{l_c}} a_{S_{luma}}[l,i,j]. \quad (40)$$

The luma detail discrimination unit (650) identifies details and structures within the luma image. It receives its inputs from luma image detail estimation unit (646) and luma sensitivity attenuation unit (644). A luma detail discriminated sample is defined as $$d_{D_{luma}}[l,i,j] = \begin{cases} 1, & (a_{S_{luma}}[l,i,j] > T_{SA_{luma}}) \wedge ((L_{D_{luma}} > e_{D_{luma}}[l,i,j]) \vee (e_{D_{luma}}[l,i,j] > U_{D_{luma}})) \\ 0, & \text{otherwise} \end{cases} \quad (41)$$

and $$T_{SA_{luma}} = \frac{1}{D_{l_r} \times D_{l_c}} \sum_{i=0}^{D_{l_r}} \sum_{j=0}^{D_{l_c}} a_{S_{luma}}[l,i,j] \quad (42)$$

with $D_{l_r}$ and $D_{l_t}$ the vertical and horizontal dimensions, respectively, at resolution level l. The upper and lower detail discrimination bounds are given by $$U_{D_{luma}} = \mu_{D_{luma}} + e_{DV_{luma}} \quad (43)$$

and $$L_{D_{luma}} = \mu_{D_{luma}} - e_{DV_{luma}}. \quad (44)$$

where $$\mu_{D_{luma}} = \frac{1}{D_{l_r} \times D_{l_c}} \sum_{i=0}^{D_{l_r}} \sum_{j=0}^{D_{l_c}} e_{D_{luma}}[l, i, j],$$

is the mean of the luma detail profile. Estimates of detail variation (DV) is taken as $$e_{DV_{luma}} = \frac{1}{D_{l_r} \times D_{l_c}} \sum_{i=0}^{D_{l_r}} \sum_{j=0}^{D_{l_c}} |\mu_{D_{luma}} - e_{D_{luma}}[l, i, j]|. \quad (45)$$

The luma detail discrimination profile is an input to luma activity level estimation unit (652). Luma activity level estimation unit (652) determines the activity level surrounding each signal sample in the luma image relative to texture and detail levels. This may be carried out through a clustering algorithm that sorts samples in the luma texture and the luma detail discrimination profiles into activity level clusters, then calculating the relative strengths of these clusters. The estimation unit (652) receives the luma texture discrimination profile from luma texture discrimination unit (648) and the luma detail discrimination profile from luma detail discrimination unit (650). It generates the luma activity level estimation profile which is then input to luma perceptual error estimation unit (222). The luma activity level (AL) estimation for resolution level l at spatial location (m,n) is defined as $$a_{luma}[l, m, n] = f_{AL_{luma}}(H_{luma}[l, m, n]) \times \left( \sum_{u=2m}^{2m+1} \sum_{v=2n}^{2n+1} a_{D_{luma}}[l, u, v] \right) \quad (46)$$

where $$f_{MM}(b) = \frac{1}{2^{\left(\frac{2b}{(N_{AL}-1)}\right)}} \quad (47)$$

and $$f_{AL_{luma}}(b) = \left(1 - \left(\frac{b}{N_{AL}}\right)^{\left(p_{AL} + \left(\frac{l}{L_{max}-1}\right)\right)}\right) \times o_{AL_{luma}} + \beta_{AL_{luma}}. \quad (48)$$

Here, $N_{AL} = (2m+w_{AL}) \times (2n+w_{AL})$, $P_{AL} = 1.8$ the activity level profile exponent with $o_{AL_{luma}} = 0.9$ and $\beta_{AL_{luma}} = 0.1$ the activity level profile parameters. Component $H_{luma}[l,m,n]$ in (46) as defined as $$H_{luma}[l, m, n] = \sum_{b=0}^{M-1} h_{(l,m,n)_{luma}}[b] \quad (49)$$

where $$h_{(l,m,n)_{luma}}[b] = \begin{cases} 1, & z_{q_{luma}}[l, i, j] = b \\ 0, & \text{otherwise} \end{cases}, \forall i, j. \quad (50)$$

$z_{q_{luma}}[l,i,j] \in Z_{(q_{luma},l,m,n)}$ is an element of the modulated windowed area, $Z_{(q_{luma},l,m,n)}$. The area of coverage is $2m - w_{AL} \le i \le 2m + w_{AL}$ and $2n - w_{AL} \le j \le 2n + w_{AL}$. $w_{AL}$ is the radius of the window. A modulated sample in this windowed area is defined as $$z_{q_{luma}}[l, i, j] = \left\lfloor \frac{z_{luma}[l, i, j]}{2^{q_{luma}[l,m,n]}} \right\rfloor. \quad (51)$$

The modulation level is given by $$q_{luma}[l,m,n] = \max_{\forall u,v}(a_{D_{luma}}[l,u,v]) \quad (52)$$

where $2m \le u \le 2m+1$, $2m \le v \le 2m+1$ and $$a_{D_{luma}}[l,i,j] = d_{D_{luma}}[l,i,j] + d_{T_{luma}}[l,i,j] \quad (53)$$

with $d_{D_{luma}}[l,i,j]$ and $d_{T_{luma}}[l,i,j]$ being defined in eqn. (41) and (37), respectively.

Figure 7:
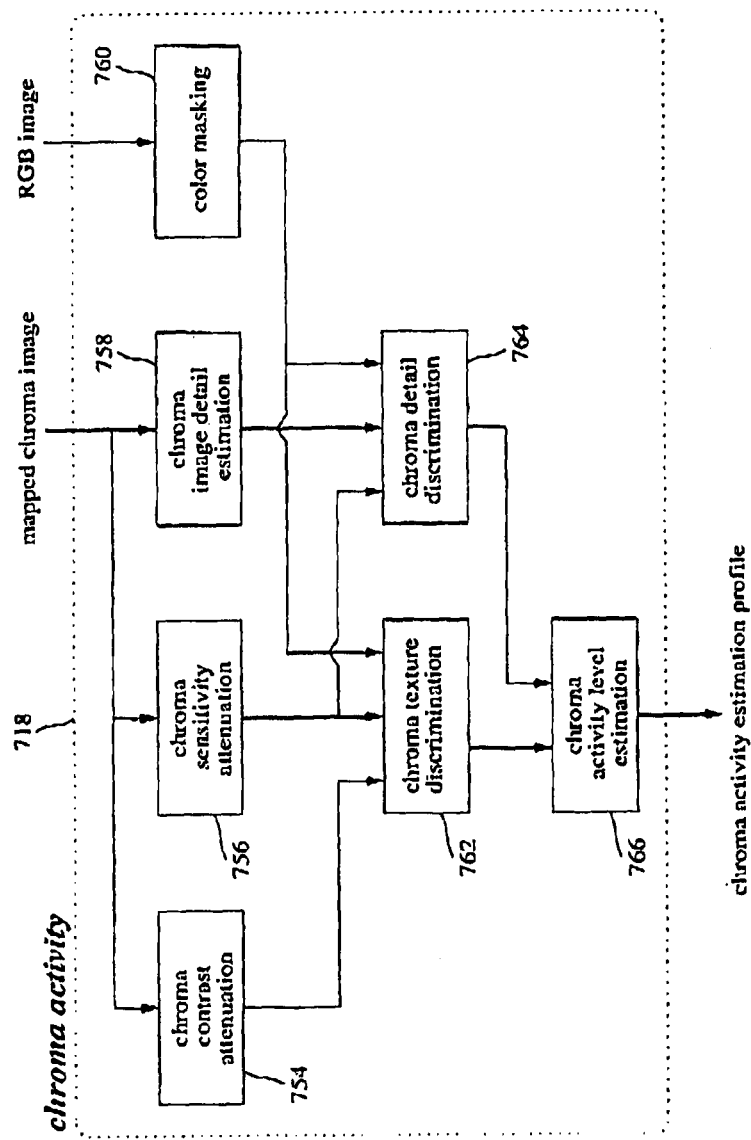
FIG. 7 is a block diagram of a chroma activity unit.

FIG. 7 illustrates the chroma activity unit (318) labelled as (718). The mapped chroma image is input to chroma contrast attenuation unit (754), chroma sensitivity attenuation unit (756) and chroma image detail estimation unit (758). Chroma contrast attenuation unit (754) attenuates the input chroma image according to the chroma contrast sensitivity levels of the HVS. The unit (754) outputs a chroma contrast profile, defined in eqn. (23), which is subsequently input to chroma texture discrimination unit (762). The chroma sensitivity attenuation unit (756) attenuates the input image according to the chroma magnitude sensitivity levels of the HVS. It outputs the chroma magnitude profile, defined in eqn. (27), which is then subsequently input to chroma texture discrimination unit (762) and chroma detail discrimination unit (764). Chroma image detail estimation unit (758) extracts detailed structures in the input image. It outputs the chroma structure profiles of the input image. These profile ($e_{D_{chroma}}[l,i,j] \in e_{D_{chroma}}, \forall l,i,j$) follow the definition of the luma versions defined in eqn. (35) and (36), but operates of chroma signals $a_{S_{chroma}}[l,i,j]$.

The color masking unit (760) estimates the visibility of chroma signals subjected to color masking effects of the HVS. This unit receives an RGB image for color masking computation. It outputs a color masking profile which is then input to chroma texture discrimination unit (762) and chroma detail discrimination unit (764). An element of the color masked (CM) profile, at the highest resolution level, is defined as $$s_{CM_{chroma}}[L_{max} - 1, i, j] = \quad (54)$$

$$\begin{cases} 1, & (R_{color_{chroma}}[i, j] > T_{color_{chroma}}) \wedge (A_{color_{chroma}}[i, j] > 0) \\ 0, & \text{otherwise} \end{cases}.$$

where $T_{color_{chroma}}$ is color masking threshold and $$R_{color_{chroma}}[i, j] = \frac{x_{RGB_{chroma}}[i, j] + 1}{x_{RGB_{chroma}}[i, j] + x_{Green}[i, j] + 1}. \quad (55)$$

$x_{Green}[i,j]$ is a pixel of the green color image. $x_{RGB_{chroma}}[i,j]$ represents a red pixel for $C_r$ chroma channel and blue pixel for $C_b$ chroma channel. The opposite is true with $x_{\overline{RGB_{chroma}}}[i,j]$ which depicts blue pixels for $C_r$ chroma channel and red pixels for $C_b$ chroma channel. The variation in color magnitude is measured by $$A_{color_{chroma}}[i,j] = \begin{cases} 1, & d_{color_{chroma}}[i,j] > \left(\frac{s_{color_{chroma}}[i,j]}{2^{(p_{color})}}\right) \\ 0, & \text{otherwise} \end{cases} \quad (56)$$

where $p_{color}=5$ is a constant parameter that determine what level of variation to measure, $$s_{color_{chroma}}[i,j] = \sum_{u=1-w_r}^{i+w_r}\sum_{v=j-w_c}^{j+w} x_{RGB_{chroma}}[u,v] \quad (57)$$

and $$d_{color_{chroma}}[i,j] = |s_{color_{chroma}}[i,j] - x_{RGB_{chroma}}[i,j]|. \quad (58)$$

Lower resolution color masking profile may be is determined through higher resolution color masking profiles as follows $$s_{CM_{chroma}}[l,m,n] = \max_{\forall i,j}(s_{CM_{chroma}}[l+1,i,j]). \quad (59)$$

where $2m \leq i \leq 2m+1$ and $2n \leq j \leq 2n+1$. Other alternative approaches may also be employed to compute color masking at lower image resolution. For example, the process described in eqn. (54) can be iteratively applied to successively lower resolution versions of RGB images.

Chroma texture discrimination unit (762) receives inputs from chroma contrast attenuation unit (754), chroma sensitivity attenuation unit (756) and color masking unit (760). It identifies and locates texture information in the chroma image, subjected to color masking. Texture information may be classified according texture level. Unit (762) outputs the chroma texture discrimination profile which is then forwarded to chroma activity level estimation unit (766). Individual element of this profile is defined as $$d_{T_{chroma}}[l,i,j] = \begin{cases} 1, & (a_{C_{chroma}}[l,i,j] > T_{C_{chroma}}) \wedge (a_{S_{chroma}}[l,i,j] > T_{S_{chroma}}) \\ 0, & \text{otherwise} \end{cases} \quad (60)$$

where $$T_{C_{chroma}} = \frac{1}{D_{l_r} \times D_{l_c}} \sum_{i=0}^{D_{l_r}} \sum_{j=0}^{D_{l_c}} a_{C_{chroma}}[l,i,j]. \quad (61)$$

with $a_{C_{chroma}}[l,i,j]$ being defined in eqn. (25). $T_{S_{chroma}}$ is equivalent to eqn. (40); but operates on chroma signals, $a_{S_{chroma}}[l,i,j]$, defined in eqn. (29).

The chroma detail discrimination unit (764) identifies details and structures within the chroma image. It receives its inputs from chroma image detail estimation unit (758), chroma sensitivity attenuation unit (756) and color masking unit (760). It outputs the chroma detail discrimination profile which is then input to chroma activity level estimation unit (766). A chroma detail discriminated sample is defined as $$d_{D_{chroma}}[l,i,j] = \begin{cases} 1, & (a_{S_{chroma}}[l,i,j] > T_{SA_{chroma}}) \wedge \begin{pmatrix} (L_{D_{chroma}} > e_{D_{chroma}}[l,i,j]) \vee \\ (e_{D_{chroma}}[l,i,j] > U_{D_{chroma}}) \end{pmatrix} \\ 0, & \text{otherwise} \end{cases} \quad (62)$$

where $$T_{SA_{chroma}} = \frac{1}{D_{l_r} \times D_{l_c}} \sum_{i=0}^{D_{l_r}} \sum_{j=0}^{D_{l_c}} a_{S_{chroma}}[l,i,j] \quad (63)$$

with $D_{l_r}$ and $D_{l_c}$ the vertical and horizontal dimensions, respectively, at resolution level l. The upper and lower detail discrimination bounds are, given by $$U_{D_{chroma}} = \mu_{D_{chroma}} + \beta_{DV_{chroma}} \quad (64)$$

and $$L_{D_{chroma}} = \mu_{D_{chroma}} - \beta_{DV_{chroma}} \quad (65)$$

where $$\mu_{D_{chroma}} = \frac{1}{D_{l_r} \times D_{l_c}} \sum_{i=0}^{D_{l_r}} \sum_{j=0}^{D_{l_c}} e_{D_{chroma}}[l,i,j]$$

is the mean of the chroma detail profile output from unit (758) and $\beta_{DV_{chroma}}=0.05$ is a constant parameter. Chroma activity level estimation unit (766) determines the activity level surrounding each signal sample in the chroma image relative to texture and detail levels. Like the luma unit (652), this may be carried out through a clustering algorithm that sorts samples in the chroma texture and the chroma detail discrimination profiles into activity level clusters, then calculating the relative strengths of these clusters. Unit (766) receives the chroma texture discrimination profile from chroma texture discrimination unit (762) and the chroma detail discrimination profile from chroma detail discrimination unit (764). It generates the to chroma activity estimation profile which is then input to chroma perceptual error estimation unit (322). The chroma activity estimation profiles are computed, with chroma signals, in an identical manner to the luma version (as define in eqns. (46) through to (53)). The exception to this is the component represented by eqn. (52) which is defined as follows $$q_{chroma}[l,m,n] = \sum_{u=2m}^{2m+1} \sum_{v=2n}^{2n+1} a_{D_{chroma}}[l,u,v]. \quad (66)$$

Figure 8:
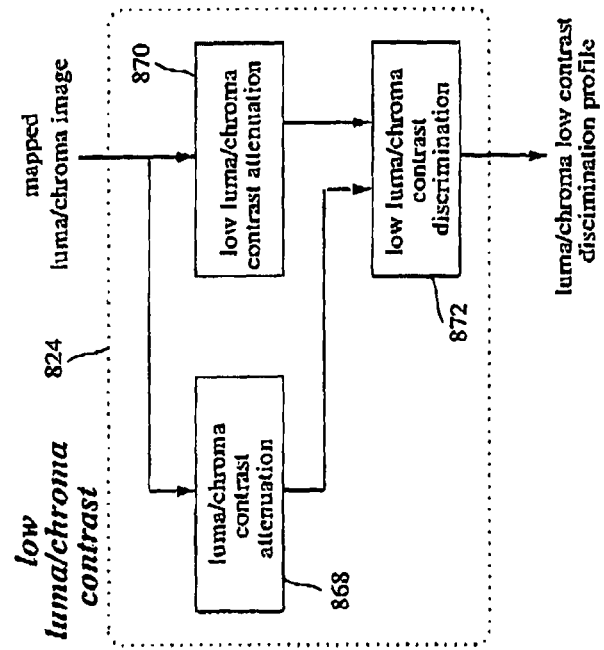
FIG. 8 is a block diagram of a low luma/chroma contrast unit.

Disclosed in FIG. 8 is a detailed block diagram of the low luma/chroma contrast unit (824) which represents the luma and chroma unit (224) and (324), respectively. Unit (824) includes luma/chroma contrast attenuation unit (868) which has the same function as the units (642) and (754) for luma and chroma channels, respectively. It receives the mapped luma/chroma image and outputs the luma/chroma contrast profile of the input image. Low luma/chroma attenuation unit (870) attenuates the input image according to low luma/chroma sensitivity levels of the HVS. It receives as an input the mapped luma/chroma image and outputs the low luma/chroma profile of the input image. The low contrast (LC) attenuated signal at resolution level 1 and spatial location (i,j) is defined as $$a_{LC_{luma}}[l,i,j] = 1 - f_{LC_{luma}}(z_{luma}[l,i,j]) \qquad (67)$$

for luma and $$a_{LC_{chroma}}[l,i,j] = 1 - f_{LC_{chroma}}(z_{chroma}[l,i,j]) \qquad (68)$$

for chroma where the low contrast profile functions are computed by $$f_{LC_{luma}}(g, l) = 1 - \left(1 - \frac{g}{M}\right)^{p_{LC_{luma}} + 2(L_{max} - l - 1)} \qquad (69)$$

and $$f_{LC_{chroma}}(g, l) = 1 - \left(1 - \frac{g}{M}\right)^{p_{LC_{chroma}} + 2(L_{max} - l - 1)} \qquad (70)$$

with $p_{LC_{luma}} = 4$ and $p_{LC_{chroma}} = 4$ the luma and chroma low contrast exponents, respectively.

Low luma/chroma contrast discrimination unit (872) receives the luma/chroma contrast profile from unit (868) and the luma/chroma low contrast profile from unit (870). The discrimination unit (872) identifies low luma/chroma regions with high contrast in inputs. It generates the low luma/chroma contrast discrimination profile which is subsequently input to the visual optimization units (228) and (328). The low contrast discriminated signal at resolution level 1 and spatial location (i,j) is defined as $$d_{LC_{luma}}[l, i, j] = \qquad (71)$$
$$\begin{cases} 1, & (L_{LC_{luma}} < a_{C_{luma}}[l, i, j] < U_{LC_{luma}}) \wedge (a_{LC_{luma}} > T_{LC_{luma}}) \\ 0, & \text{otherwise} \end{cases}$$

where the $U_{LC_{luma}} = 0.4$ and $L_{LC_{luma}} = 0.15$ are the upper and lower contrast discrimination bounds, respectively. $T_{LS_{luma}} = 0.15$ is the low contrast threshold point.

Figure 9:
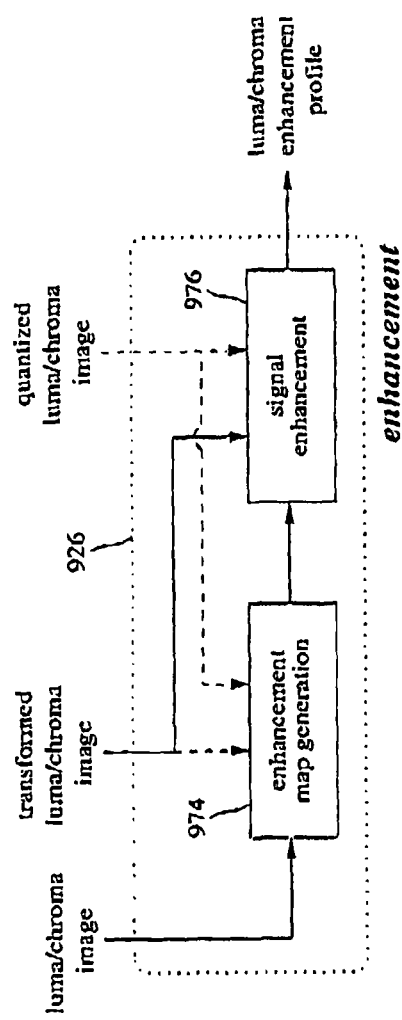
FIG. 9 is a block diagram of a enhancement unit.

Referring to FIG. 9 there is shown a more detailed block diagram of the enhancement unit (226) and (326) which is provided with a corresponding reference unit (926) in FIG. 9. The unit includes an enhancement map generation unit (974) which identifies regions of an input image that is to be enhanced. Enhancement map is generated based on picture characteristics, e.g., details, texture, etc. Unit (974) has as its input the luma/chroma image. It may also utilize transformed luma/chroma image or quantized luma/chroma image. If the quantizer is approximately one, then the quantized luma/chroma image can be used instead of the transformed or quantized luma/chroma image. Individual element in the enhancement map may be defined as $$E_{MAP_{luma}}[l, \theta, i, j] = \qquad (72)$$
$$\begin{cases} 1, & (V_{E_{luma}}[l, i, j] > T_{VE_{luma}}) \vee (H_{E_{luma}}[l, i, j] > T_{HE_{luma}}) \\ 0, & \text{otherwise} \end{cases}$$

where $$V_{E_{luma}}[l, i, j] = |z_{luma}[l, i, j] - z_{luma}[l, i-1, j]| \qquad (73)$$

and $$H_{E_{luma}}[l, i, j] = |z_{luma}[l, i, j] - z_{luma}[l, i, j-1]| \qquad (74)$$

are the horizontal and vertical edge gradient, respectively. $T_{VE_{luma}} = 0.15$ and $T_{HE_{luma}} = 0.15$ are the vertical and horizontal edge thresholds, respectively. The unit (974) outputs an enhancement map to a signal enhancement unit (976). The signal enhancement unit (976) determines the level of enhancement that can be applied to individual coefficients in the transformed luma/chroma image. It has the transformed luma/chroma image as input. If the quantizer is approximately one, this input can be replaced with the quantized luma/chroma image. The signal enhancement unit (976) generates the luma/chroma enhancement profile, consisting of enhancement level for each transformed luma/chroma coefficient, which is then input to the visual optimization units (228) and (328) for luma and chroma channels, respectively. The enhancement level (EL) for individual transform sample is defined as $$t_{EL_{luma}}[l, \theta, m, n] = \qquad (75)$$
$$\begin{cases} R_{E_{luma}}[l, \theta, m, n] \times \omega_{E1}, & C_{MAP_{luma}}[l, m, n] > 0 \\ R_{E_{luma}}[l, \theta, m, n], & \text{otherwise} \end{cases}.$$

where $\omega_{E1_{luma}} = 0.5$ and $$R_{E_{luma}}[l, \theta, m, n] = \qquad (76)$$
$$\begin{cases} S_{BE_{luma}}[l, \theta, m, n] \times \omega_{E2_{luma}}, & S_{BE_{luma}}[l, \theta, m, n] < T_{BE1_{luma}} \\ S_{BE_{luma}}[l, \theta, m, n] \times \omega_{E3_{luma}}, & S_{BE_{luma}}[l, \theta, m, n] > T_{BE2_{luma}} \\ S_{BE_{luma}}[l, \theta, m, n], & \text{otherwise} \end{cases}$$

with $\omega_{E2_{luma}} = 2$, $\omega_{E3_{luma}} = 0.5$, $T_{BE1_{luma}} = 1$ and $T_{BE2_{luma}} = 5$. Elements in the composite enhancement map from eqn. (75) is defined as $$C_{MAP_{luma}}[l, m, n] = \sum_{u=2m}^{2m+1} \sum_{j=2n}^{2n+1} E_{MAP_{luma}}[l, i, j]. \qquad (77)$$

The base enhancement (BE) level in eqn. (76) is defined as $$S_{BE_{luma}}[l, \theta, m, n] = \frac{\frac{1}{N} \sum_{u=m-w_r}^{m+w_r} \sum_{v=n-w_c}^{n+w_c} |X[l, \theta, u, v]|}{|X[l, \theta, u, v]|} \qquad (78)$$

with $N = (2w_r + 1) \times (2w_c + 1)$.

Figure 10:
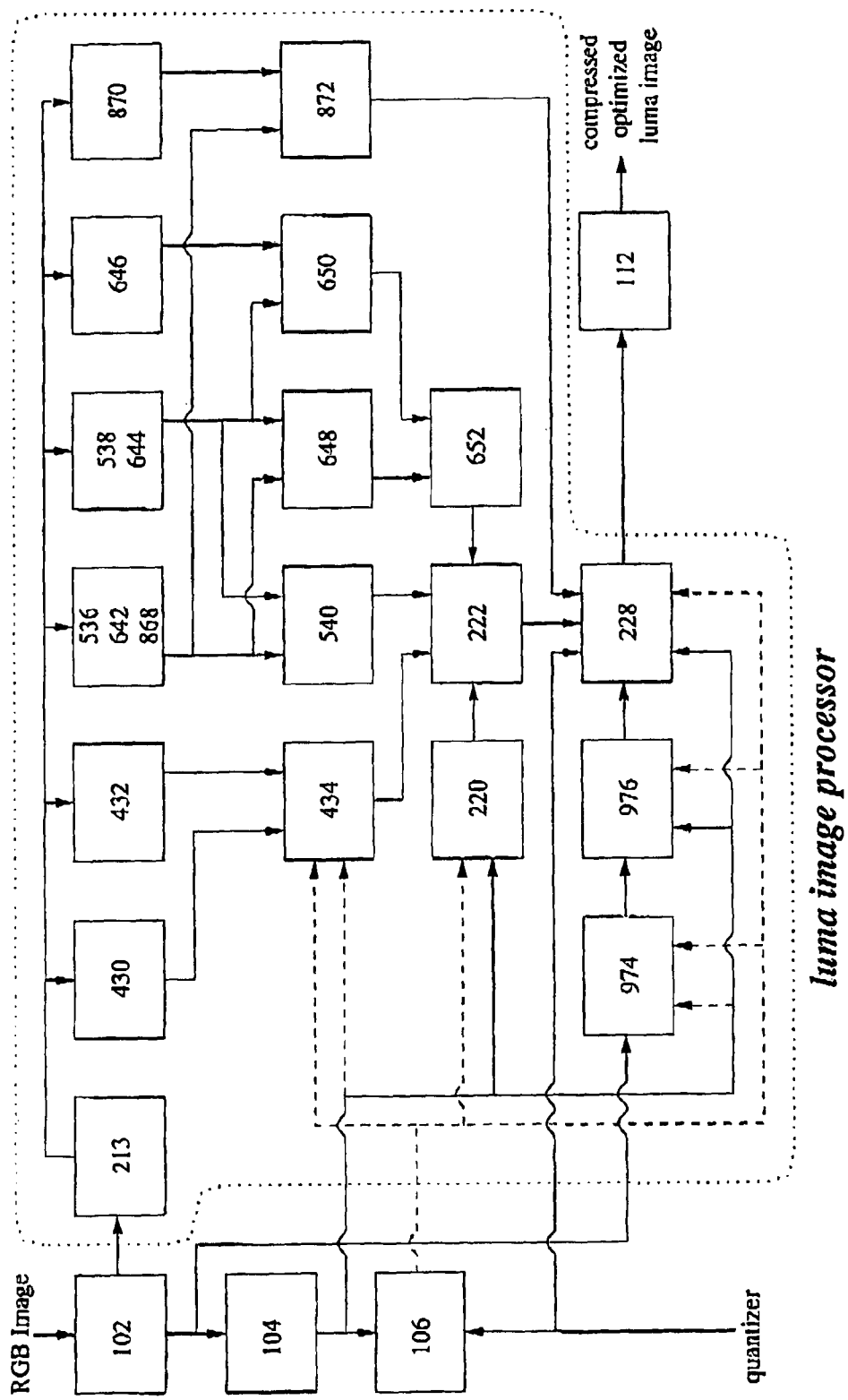
FIG. 10 is a detailed block diagram of all of the luma components of the luma image processor of FIG. 2.
Figure 11:
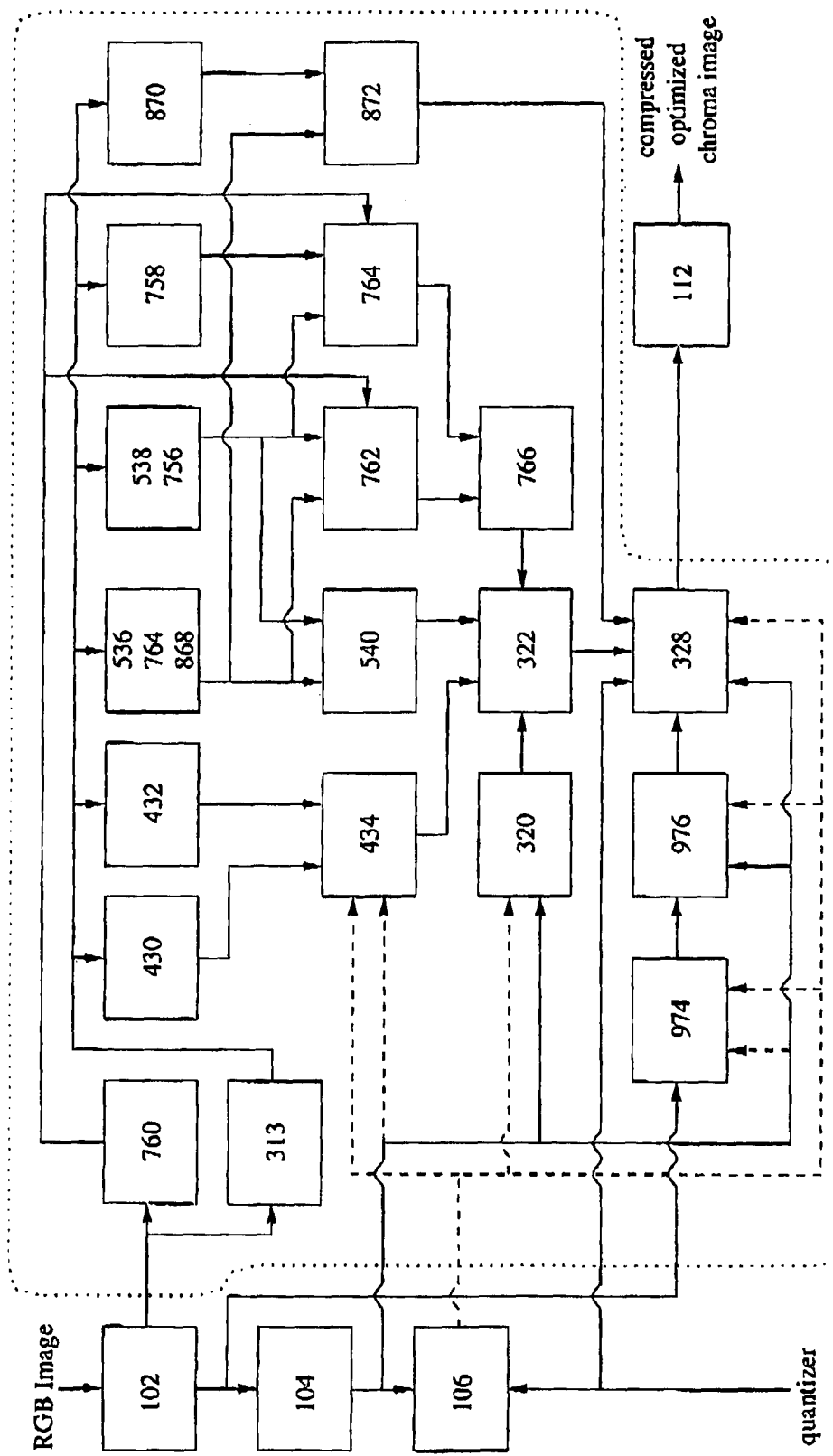
FIG. 11 is a detailed block diagram of all of the chroma components of the chroma image processor of FIG. 3.

FIGS. 10 and 11 are detailed block diagrams, respectively, of the luma and chroma components of the compression system (100), illustrating all subcomponents.

Figure 12:
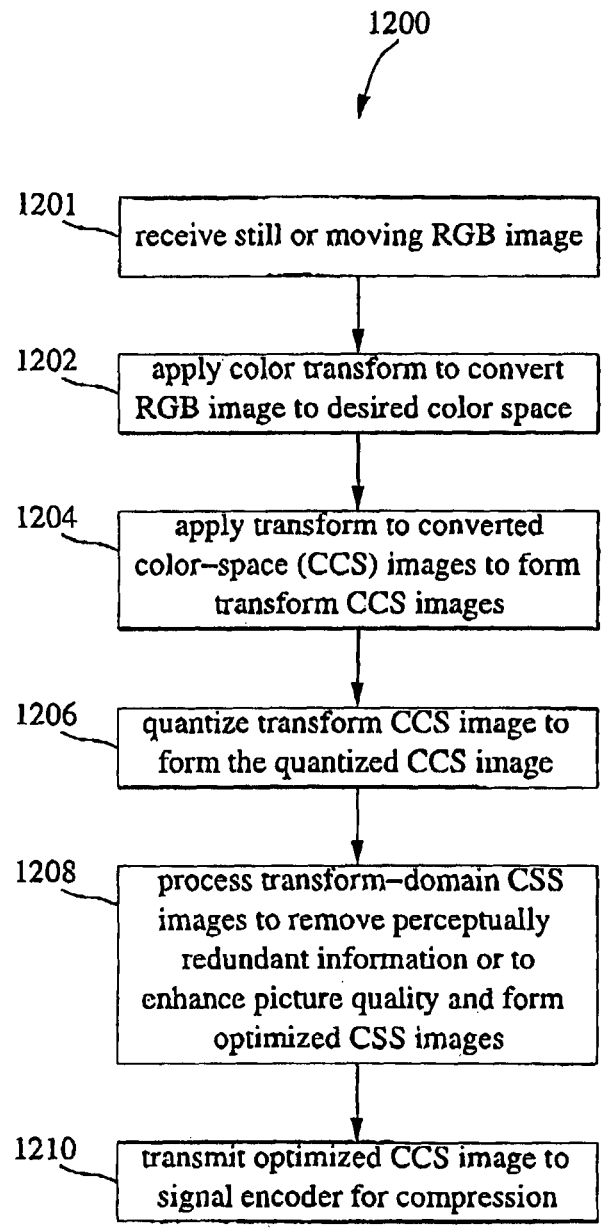
FIG. 12 is a flow diagram showing a process of generating a perceptually lossless and perceptually enhanced image using the apparatus of FIG. 1.

Referring to FIG. 12 there is shown a flow diagram 1200 of the process involved in generating a perceptually lossless or perceptually enhanced image in the transform-domain prior to compression. Firstly at step 1201, the still or moving image is received. The image is color transformed at step 1102 to convert the received image to a desired color space (e.g. component color) to form a converted color-space (CCS) image. For component color, CCS images are Y, $C_b$ and $C_r$. At step 1204 a transform (e.g. DWT, DCT) is applied to the CCS image in order to create transformed CCS images, each of which consists of a set of transform CCS coefficients. At step 1206, transform CCS images are quantized to produce quantized CCS images. At step 1208, the transformed or quantized CCS images are processed by image processors (208) and (308) in order to remove any visually redundant information or to visually enhance transform-domain CCS images to form optimized CCS images. If the quantizer is approximately one, the quantized CCS images are used to generate optimized CCS images. Otherwise, transform CCS images are used. At step 1210, optimized CCS images are transmitted to an encoder for compression followed by storage, transmission or both.

Figure 13:
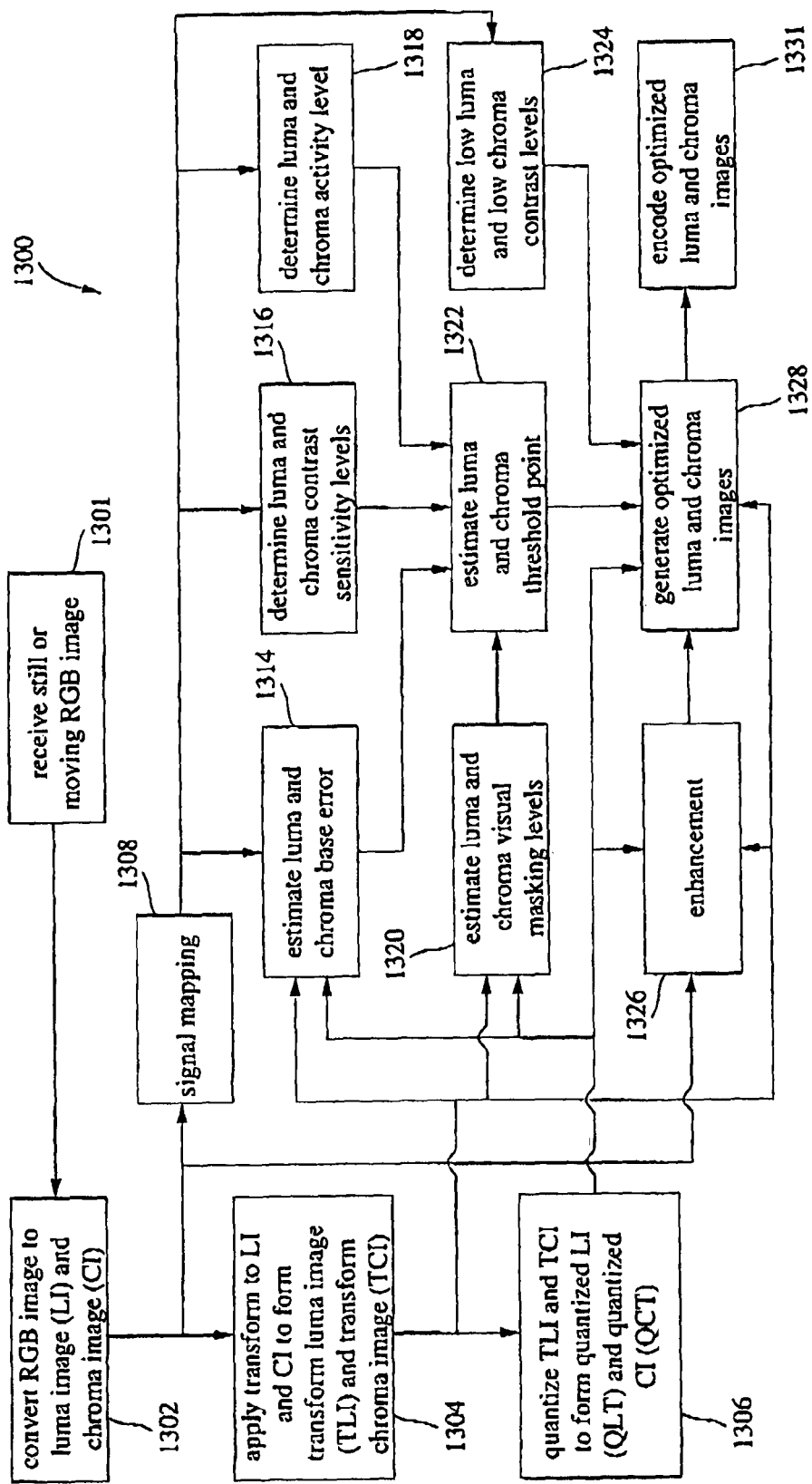
FIG. 13 is a flow diagram showing the process of generating perceptually lossless and perceptually enhanced compressed images from RGB images.

Referring to FIG. 13 there is shown a further flow diagram 1300, which is more detailed than the flow diagram 1200 of FIG. 12. Initially the RGB image, which can be a still or moving image, is received at step 1301. The color transform at step 1302 converts the RGB image into luma and chroma images of the component color space. Other color spaces could also be used at step 1302 apart from component color. At step 1304, transform (e.g. DWT, DCT) is applied to each of the luma and chroma image to generate transformed luma and transformed chroma images. At step 1306 the transformed luma and transformed chroma images are quantized. At step 1314, the luma/chroma base errors are estimated based on the mapped luma/chroma image and optionally the transformed luma/chroma image or the quantized luma/chroma image. At step 1316 the luma/chroma contrast sensitivity level is determined from the mapped luma/chroma image. At step 1318 the luma activity level is determined from the mapped luma image. Also at step 1318, the chroma activity level is determined from the mapped chroma image and the RGB image. At step 1320 the visual masking level is estimated based on inputs from the transform luma/chroma image or quantized luma/chroma image. At step 1322 an estimate of the luma/chroma perceptual error threshold is made based on outputs of steps 1314, 1316, 1318 and 1320. At step 1324 the low luma/chroma contrast activity level is determined. It is based on inputs from the mapped luma/chroma image. The chroma portion of 1324 is optional. At step 1326 an enhancement profile is determined based on inputs from the luma/chroma image, the transformed luma/chroma image and the quantized luma/chroma image. At step 1328 visual optimization is carried out based on the output from step 1322, the enhancement profile from step 1326, the transformed luma/chroma images from step 1304, the quantized luma/chroma images from step 1306, and the low luma/chroma contrast, activity profile from step 1324. The optimized luma/chroma image from step 1328 is sent to 1331 to be encoded into the compressed optimized image.

Figure 14:
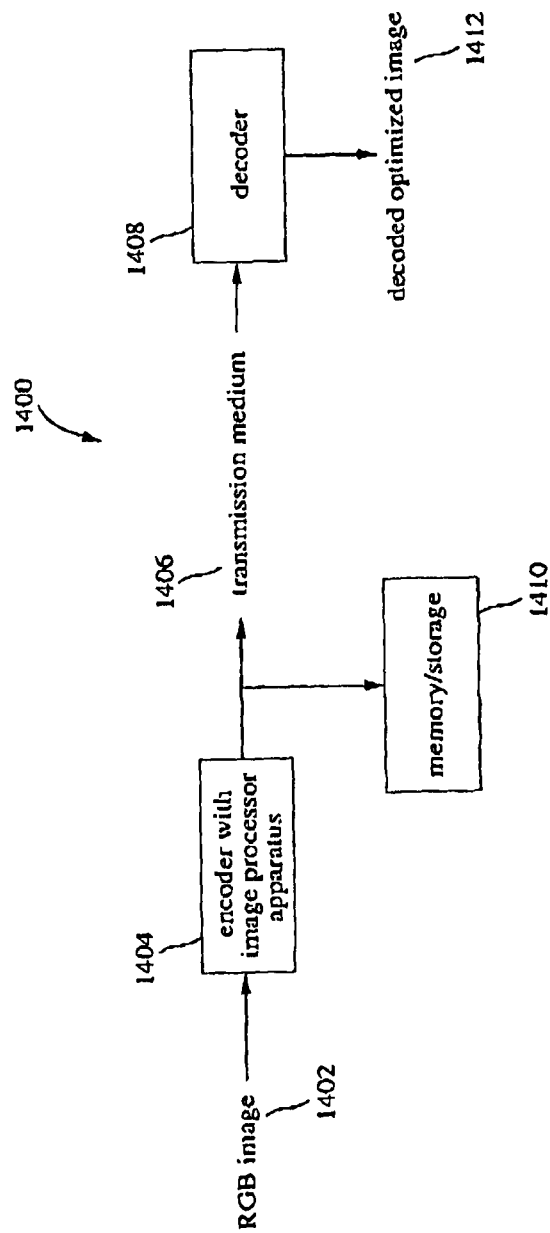
FIG. 14 is a block diagram showing apparatus for generating a perceptually lossless and perceptually enhanced image which is then compressed and either stored in memory or transmitted over a transmission medium to a decoder.

With reference to FIG. 14 there is shown a block diagram of a system or apparatus 1400 that is used to provide compression of RGB images that results in perceptually lossless or perceptually enhanced quality level. The RGB image 1402 is input to an encoding system with the image processing apparatus 1404 which encodes the RGB image to a perceptually lossless or perceptually enhanced quality level. After encoding, the compressed image stream can either be stored in memory 1410 or sent through a transmission medium 1406. The compressed image stream that has been transmitted is decoded by decoder 1408. This decoding produces the decoded optimized (RGB) image 1412 that is perceptually lossless or perceptually enhanced in quality compared with the RGB image 1402.

Any of the processes or flow diagrams 1200 or 1300 may be implemented as computer-readable instructions that are stored in a computer-readable medium, such as memory or a transmission medium such that, when executed, perform any one or more of the operations illustrated in the blocks of FIG. 12 or 13. Thus any one or more of the operations depicted in the blocks of FIGS. 12 and 13 can be embodied as computer-executable instructions embodied on computer readable media.

A particular advantage of the invention is that it is compliant with standardized image coding systems (e.g. JPEG2000) and thus is easily adaptable and deployable to existing image compression applications. The invention provides perceptually lossless or perceptually enhanced compression of pictures at compression ratios that are superior to information lossless compression. The invention can be implemented in both hardware and software.

The invention provides an analysis of image content which takes account of the entire image and then generates an optimized image in the transform-domain (e.g. DWT) followed by encoding to produce the compressed optimized image. While the descriptions in all figures centered on the component color ($YC_bC_r$), the invention can operate on other color spaces (e.g. CIE XYZ). The invention can be used to compress a variety of images including natural images, medical images, cinematic images (for digital cinema) and satellite images to name a few.

In summary, the invention provides a plug-in technology that employs an advanced HVS model along with a visual optimization function to provide compression systems with the ability to achieve a perceptually lossless or perceptually enhanced quality compression of images with superior compression ratios to information lossless compression schemes.

The invention claimed is:
1. A method of generating perceptually lossless compression of image data or perceptually enhanced compression of image data including the steps of:
  receiving an image;
  color transforming the received image to a desired color space, forming converted color-space (CCS) images;
  transforming the CCS images into transformed CCS images;
  applying quantization to the transformed CCS images to form quantized CCS images;
  processing the image to produce optimized images that are perceptually lossless or perceptually enhanced in quality, processing including the steps of:
  mapping pixels in the CCS images to corresponding CCS transform-domain coefficients, forming mapped CCS images;
  determining a contrast and magnitude sensitivity level of the mapped CCS images based on the human visual system (HVS) and outputting a contrast sensitivity profile for the mapped CCS images;
  calculating the activity level in the mapped CCS images and outputting an activity estimation profile;
  using the mapped CCS images along with the transformed or quantized CCS images for estimating a base error magnitude at or below a visibility threshold and outputting a base error magnitude profile;
  using the visual masking profile, contrast sensitivity profile, activity estimation profile and base error magnitude profile to determine a perceptual error estimation;
  sending the mapped CCS images along with the transformed or quantized CCS images to an enhancement unit to determine where and how much information should be enhanced in the transformed or quantized CCS images and outputting a resulting enhancement profile representing where and how much information should be enhanced;
  sending the mapped CCS images to a low luminance/chrominance contrast unit to determine a low luminance/chrominance contrast profile; and encoding the optimized images for subsequent storage and/or transmission.

2. A The method according to claim 1 wherein the optimized images are perceptually lossless and thus visually indistinct compared with the received image when the optimized images are inverse transformed and converted back to the domain of the received image.

3. The method according to claim 1 or claim 2 wherein the optimized images are perceptually enhanced and have perceptually enhanced picture quality compared with the received image when the optimized images are inverse transformed and converted back to the domain of the received image.

4. An apparatus for generating perceptually lossless image data or perceptually enhanced image data including:
an image processor for receiving and processing transformed images to produce optimized images that are perceptually lossless or perceptually enhanced in quality, wherein the image processor includes:
a color transform unit for color transforming a received image to a desired color space, forming converted color-space (CCS) images;
a transform unit for receiving CCS images and transforming the CCS images into transformed CCS images each containing a set of transform coefficients;
a quantization unit to quantize the transformed CCS images to form quantized CCS images;
a signal mapping unit to map pixels in the CCS images to corresponding CCS transform-domain coefficients, forming mapped CCS images;
a visual masking estimation unit which utilizes the transformed or quantized CCS images to determine a level of masking and output a visual masking profile;
a contrast sensitivity unit for receiving the mapped CCS images to determine a contrast and magnitude sensitivity level of the mapped CCS images and output the contrast sensitivity profile for the mapped CCS images;
an activity unit for receiving the mapped CCS images to calculate the activity level in the mapped CCS images and output an activity estimation profile;
a base error unit for receiving the mapped CCS images along with the transformed or quantized CCS images to estimate a base error magnitude at or below a visibility threshold and output a base error magnitude profile;
a perceptual error estimation unit for receiving the visual masking profile, contrast sensitivity profile, activity estimation profile and base error magnitude profile to determine a perceptual error estimation at or below the given threshold;
an enhancement unit for receiving the mapped CCS images along with the transformed or quantized CCS images to determine where and how much information should be enhanced in the transformed or quantized CCS images and outputting a resulting enhancement profile representing where and how much information should be enhanced;
a low luminance/chrominance contrast unit for receiving the mapped CCS images to determine a low luminance/chrominance contrast profile;
and
an encoder for compressing the optimized images;
wherein the compressed optimized images are subsequently prepared for storage and/or transmission.

5. The apparatus according to claim 4 wherein the optimized images are perceptually lossless and thus visually indistinct compared with the received image when the optimized images are inverse transformed and converted back to the domain of the received image.

6. The apparatus according to claim 4 or claim 5 wherein the optimized images are perceptually enhanced and have perceptually enhanced picture quality compared with the received image when the optimized images are inverse transformed and converted back to the domain of the received image.

7. A non-transitory computer-readable medium including computer-executable instructions that, when executed on a processor, in a method of generating perceptually lossless image data or perceptually enhanced image data, directs a device to:
color transform a received image to a desired color space, forming converted color-space (CCS) images;
transform the CCS images into transformed CCS images;
apply quantization to the transformed CCS images to form quantized CCS images;
transform the CCS images into transformed CC images;
process the transformed images to produce optimized images that are perceptually lossless or perceptually enhanced in quality, processing including the steps of:
mapping pixels in the CCS images to corresponding CCS transform-domain coefficients, forming mapped CCS images;
determining a contrast and magnitude sensitivity level of the mapped CCS images based on the HVS and outputting a contrast sensitivity profile for the mapped CCS images;
calculating the activity level in the mapped CCS images and outputting an activity estimation profile;
using the mapped CCS images along with the transformed or quantized CCS images for estimating a base error magnitude at or below a visibility threshold and outputting a base error magnitude profile;
using the visual masking profile, contrast sensitivity profile, activity estimation profile and base error magnitude profile to determine a perceptual error estimation;
sending the mapped CCS images along with the transformed or quantized CCS images to an enhancement unit to determine where and how much information should be enhanced in the transformed or quantized CCS images and outputting a resulting enhancement profile representing where and how much information should be enhanced;
sending the mapped CCS images to a low luminance/chrominance contrast unit to determine a low luminance/chrominance contrast profile; and
encode (compress) the optimized images.

8. A The non-transitory computer-readable medium according to claim 7 wherein the optimized images are perceptually lossless and thus visually indistinct compared with the received image when the optimized images are inverse transformed and converted back to the domain of the received image.

9. The non-transitory computer-readable medium according to any claim 7 or claim 8 wherein the optimized images are perceptually enhanced and have perceptually enhanced picture quality compared with the received image when the optimized images are inverse transformed and converted back to the domain of the received image.

* * * * *